(12) United States Patent
Yang et al.

(10) Patent No.: US 12,580,218 B2
(45) Date of Patent: Mar. 17, 2026

(54) METHOD AND SYSTEM FOR PAIRING BARE CELLS

(71) Applicant: CONTEMPORARY AMPEREX TECHNOLOGY CO., LIMITED, Ningde (CN)

(72) Inventors: Mukai Yang, Ningde (CN); Wensheng Pan, Ningde (CN); Dengdeng Huang, Ningde (CN); Qinkun Huang, Ningde (CN); Zhiguo Zhang, Ningde (CN); Xiang Fan, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/213,027

(22) Filed: May 20, 2025

(65) Prior Publication Data

US 2025/0293282 A1 Sep. 18, 2025

Related U.S. Application Data

(63) Continuation of application No. PCT/CN2024/097528, filed on Jun. 5, 2024.

(30) Foreign Application Priority Data

Mar. 15, 2024 (CN) .......................... 202410295777.9

(51) Int. Cl.
*H01M 10/04* (2006.01)
*G06T 7/00* (2017.01)
*H01M 50/204* (2021.01)

(52) U.S. Cl.
CPC ....... *H01M 10/0404* (2013.01); *G06T 7/0004* (2013.01); *H01M 50/204* (2021.01)

(58) Field of Classification Search
CPC ........................ H01M 10/0404; H01M 50/204
See application file for complete search history.

(56) References Cited

U.S. PATENT DOCUMENTS

2024/0070852 A1 2/2024 Tu et al.

FOREIGN PATENT DOCUMENTS

| CN | 106081597 A | * 11/2016 | ............. B65G 47/82 |
| CN | 107681187 A | 2/2018 | |

(Continued)

OTHER PUBLICATIONS

International Search Report in the international application No. PCT/CN2024/097528, mailed on Nov. 28, 2024, 6 pages with English translation.

(Continued)

*Primary Examiner* — Jonathan G Jelsma
(74) *Attorney, Agent, or Firm* — Ladas & Parry, LLP

(57) ABSTRACT

Bare cells are loaded onto a loading zone of each of conveying apparatuses arranged side by side, at least two carrying sections being provided in the loading zone of each conveying apparatus. The bare cells are conveyed to corresponding pairing zones by two conveying apparatuses, where a conveying direction of the conveying apparatuses is arranged to intersect with a direction in which the two conveying apparatuses are arranged side by side, tabs of the bare cells on the two conveying apparatuses are different in arrangement, and two carrying sections are provided in the pairing zone of each conveying apparatus. When the arrangement of qualified bare cells does not meet a pairing requirement for the bare cells, a corresponding qualified bare cell is picked up by a picking apparatus and moved along a preset direction between a buffer station and the carrying sections in a pairing zone of the conveying apparatus.

16 Claims, 14 Drawing Sheets

(56) References Cited

FOREIGN PATENT DOCUMENTS

| CN | 107959039 | A | 4/2018 |
|----|-----------|---|--------|
| CN | 108023115 | A | 5/2018 |
| CN | 108258321 | A | 7/2018 |
| CN | 110299567 | A | 10/2019 |
| CN | 110350231 | A | 10/2019 |
| CN | 110416624 | A | 11/2019 |
| CN | 212934704 | U | 4/2021 |
| CN | 214123942 | U | 9/2021 |
| CN | 114054359 | A | 2/2022 |
| CN | 218133419 | U | 12/2022 |
| CN | 218414682 | U | 1/2023 |
| CN | 116872248 | A | 10/2023 |
| CN | 116741890 | B | 11/2023 |
| CN | 116986235 | A | 11/2023 |
| CN | 117068745 | A | 11/2023 |
| CN | 220347513 | U | 1/2024 |
| CN | 117655579 | A | 3/2024 |
| CN | 117686517 | A | 3/2024 |
| CN | 117895092 | A | 4/2024 |
| WO | 2019215089 | A1 | 11/2019 |

OTHER PUBLICATIONS

Written Opinion of the International Search Authority in the international application No. PCT/CN2024/097528, mailed on Nov. 28, 2024, 8 pages with English translation.
Notification of Examination Opinion on Request for Expedited Pre-Examination regarding Chinese Application No. 202410295777.9, issued on Mar. 12, 2024, 8 pages with English translation.
First Office Action of the Chinese application No. 202410295777.9, issued on Apr. 18, 2024, 32 pages with English translation.
Notice of Allowance of the Chinese application No. 202410295777.9, issued on May 14, 2024, 6 pages with English translation.

* cited by examiner

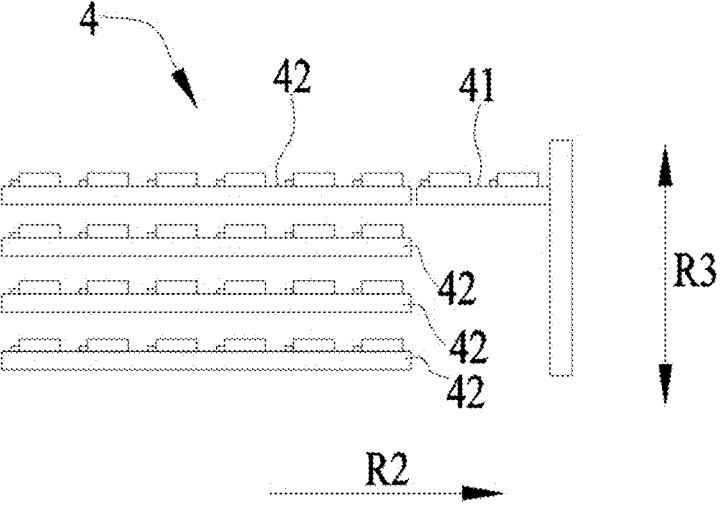

FIG. 15

| | |
|---|---|
| Load bare cells onto a loading zone of each of two conveying apparatuses arranged side by side, at least two carrying sections being provided in the loading zone of each conveying apparatus | S100 |
| Convey the bare cells carried by corresponding carrying sections to corresponding pairing zones by the two conveying apparatuses arranged side by side | S1 |
| Pairing: when the arrangement of qualified bare cells does not meet a pairing requirement for the bare cells, pick up, by a picking apparatus, a corresponding qualified bare cell and move the qualified bare cell along a preset direction between a buffer station and the carrying sections in a pairing zone of the conveying apparatus, enabling the bare cells in the pairing zone to meet the pairing requirement for the bare cells | S2 |

FIG. 16

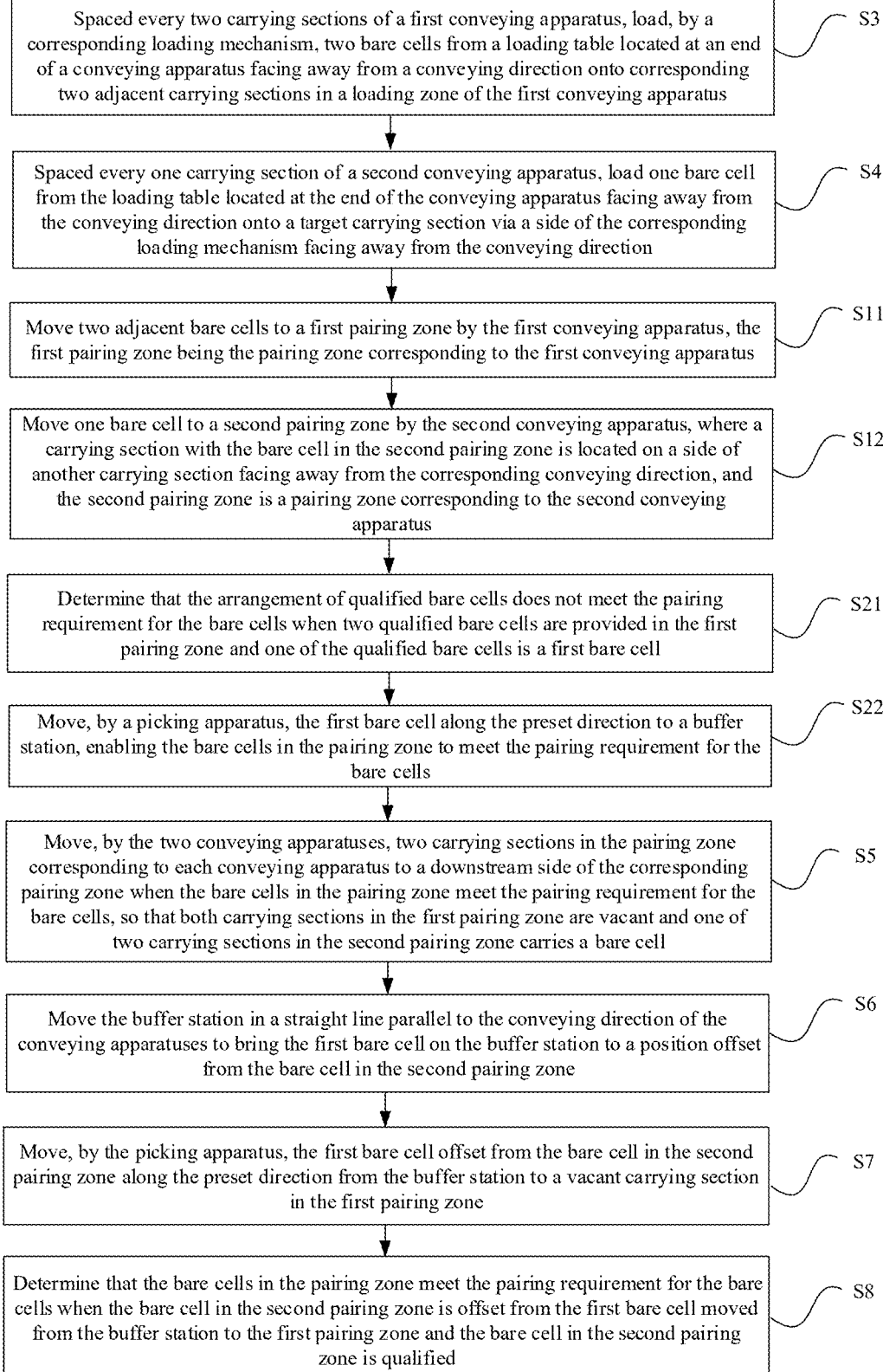

Spaced every two carrying sections of a first conveying apparatus, load, by a corresponding loading mechanism, two bare cells from a loading table located at an end of a conveying apparatus facing away from a conveying direction onto corresponding two adjacent carrying sections in a loading zone of the first conveying apparatus    S3

Spaced every one carrying section of a second conveying apparatus, load one bare cell from the loading table located at the end of the conveying apparatus facing away from the conveying direction onto a target carrying section via a side of the corresponding loading mechanism facing away from the conveying direction    S4

Move two adjacent bare cells to a first pairing zone by the first conveying apparatus, the first pairing zone being the pairing zone corresponding to the first conveying apparatus    S11

Move one bare cell to a second pairing zone by the second conveying apparatus, where a carrying section with the bare cell in the second pairing zone is located on a side of another carrying section facing away from the corresponding conveying direction, and the second pairing zone is a pairing zone corresponding to the second conveying apparatus    S12

Determine that the arrangement of qualified bare cells does not meet the pairing requirement for the bare cells when two qualified bare cells are provided in the first pairing zone and one of the qualified bare cells is a first bare cell    S21

Move, by a picking apparatus, the first bare cell along the preset direction to a buffer station, enabling the bare cells in the pairing zone to meet the pairing requirement for the bare cells    S22

Move, by the two conveying apparatuses, two carrying sections in the pairing zone corresponding to each conveying apparatus to a downstream side of the corresponding pairing zone when the bare cells in the pairing zone meet the pairing requirement for the bare cells, so that both carrying sections in the first pairing zone are vacant and one of two carrying sections in the second pairing zone carries a bare cell    S5

Move the buffer station in a straight line parallel to the conveying direction of the conveying apparatuses to bring the first bare cell on the buffer station to a position offset from the bare cell in the second pairing zone    S6

Move, by the picking apparatus, the first bare cell offset from the bare cell in the second pairing zone along the preset direction from the buffer station to a vacant carrying section in the first pairing zone    S7

Determine that the bare cells in the pairing zone meet the pairing requirement for the bare cells when the bare cell in the second pairing zone is offset from the first bare cell moved from the buffer station to the first pairing zone and the bare cell in the second pairing zone is qualified    S8

FIG. 17

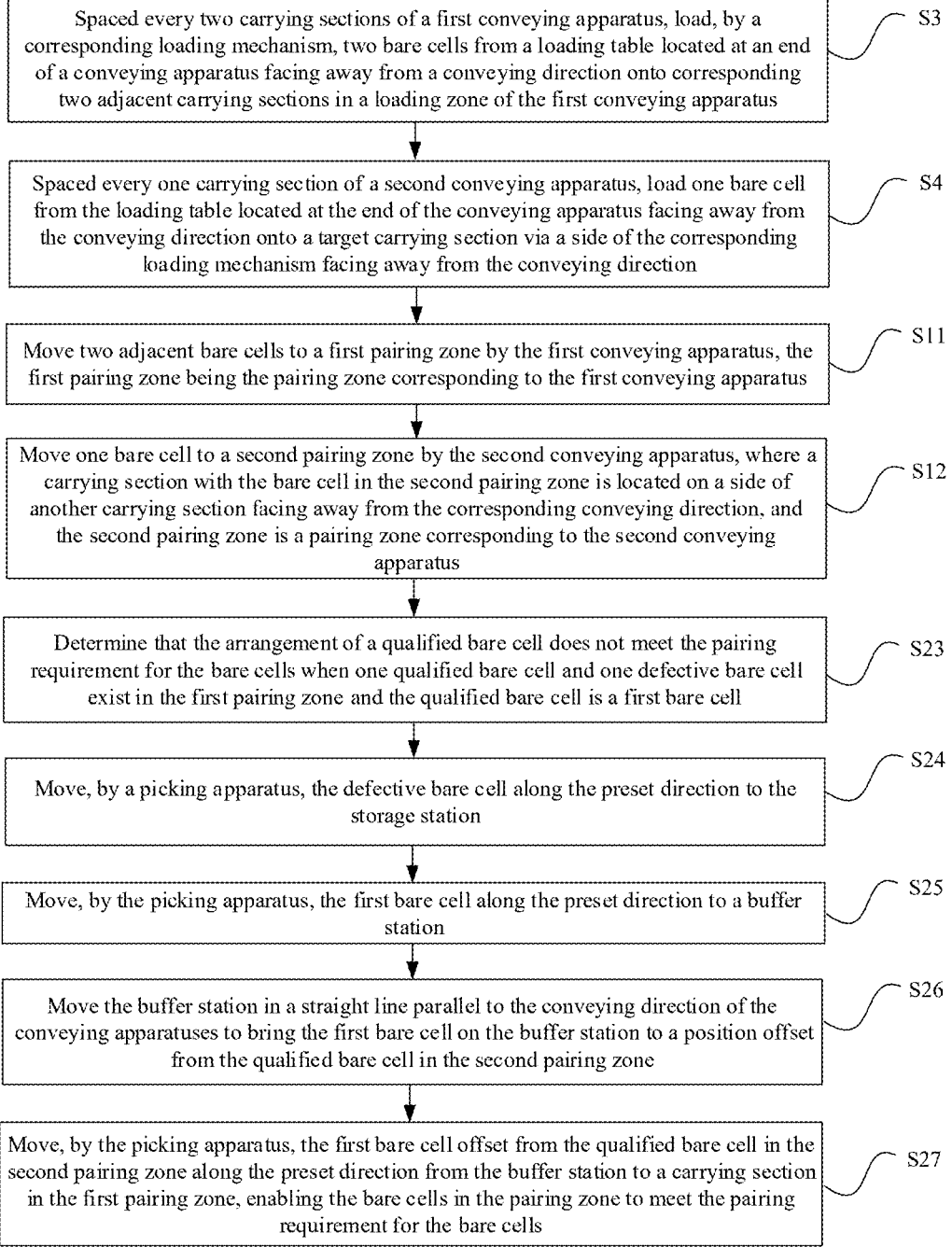

Spaced every two carrying sections of a first conveying apparatus, load, by a corresponding loading mechanism, two bare cells from a loading table located at an end of a conveying apparatus facing away from a conveying direction onto corresponding two adjacent carrying sections in a loading zone of the first conveying apparatus — S3

Spaced every one carrying section of a second conveying apparatus, load one bare cell from the loading table located at the end of the conveying apparatus facing away from the conveying direction onto a target carrying section via a side of the corresponding loading mechanism facing away from the conveying direction — S4

Move two adjacent bare cells to a first pairing zone by the first conveying apparatus, the first pairing zone being the pairing zone corresponding to the first conveying apparatus — S11

Move one bare cell to a second pairing zone by the second conveying apparatus, where a carrying section with the bare cell in the second pairing zone is located on a side of another carrying section facing away from the corresponding conveying direction, and the second pairing zone is a pairing zone corresponding to the second conveying apparatus — S12

Determine that the arrangement of a qualified bare cell does not meet the pairing requirement for the bare cells when one qualified bare cell and one defective bare cell exist in the first pairing zone and the qualified bare cell is a first bare cell — S23

Move, by a picking apparatus, the defective bare cell along the preset direction to the storage station — S24

Move, by the picking apparatus, the first bare cell along the preset direction to a buffer station — S25

Move the buffer station in a straight line parallel to the conveying direction of the conveying apparatuses to bring the first bare cell on the buffer station to a position offset from the qualified bare cell in the second pairing zone — S26

Move, by the picking apparatus, the first bare cell offset from the qualified bare cell in the second pairing zone along the preset direction from the buffer station to a carrying section in the first pairing zone, enabling the bare cells in the pairing zone to meet the pairing requirement for the bare cells — S27

FIG. 18

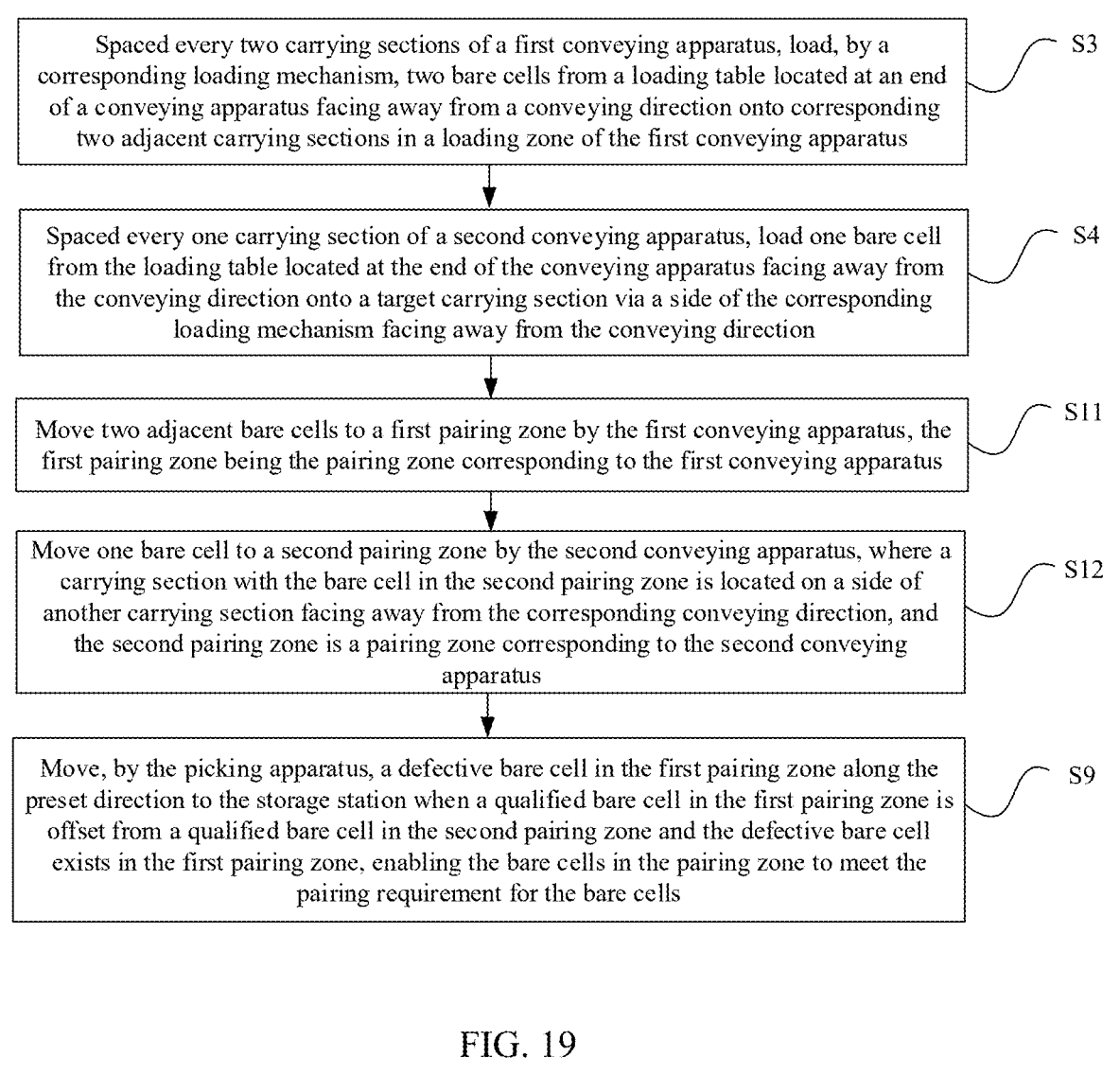

Spaced every two carrying sections of a first conveying apparatus, load, by a corresponding loading mechanism, two bare cells from a loading table located at an end of a conveying apparatus facing away from a conveying direction onto corresponding two adjacent carrying sections in a loading zone of the first conveying apparatus    S3

↓

Spaced every one carrying section of a second conveying apparatus, load one bare cell from the loading table located at the end of the conveying apparatus facing away from the conveying direction onto a target carrying section via a side of the corresponding loading mechanism facing away from the conveying direction    S4

↓

Move two adjacent bare cells to a first pairing zone by the first conveying apparatus, the first pairing zone being the pairing zone corresponding to the first conveying apparatus    S11

↓

Move one bare cell to a second pairing zone by the second conveying apparatus, where a carrying section with the bare cell in the second pairing zone is located on a side of another carrying section facing away from the corresponding conveying direction, and the second pairing zone is a pairing zone corresponding to the second conveying apparatus    S12

↓

Move, by the picking apparatus, a defective bare cell in the first pairing zone along the preset direction to the storage station when a qualified bare cell in the first pairing zone is offset from a qualified bare cell in the second pairing zone and the defective bare cell exists in the first pairing zone, enabling the bare cells in the pairing zone to meet the pairing requirement for the bare cells    S9

FIG. 19

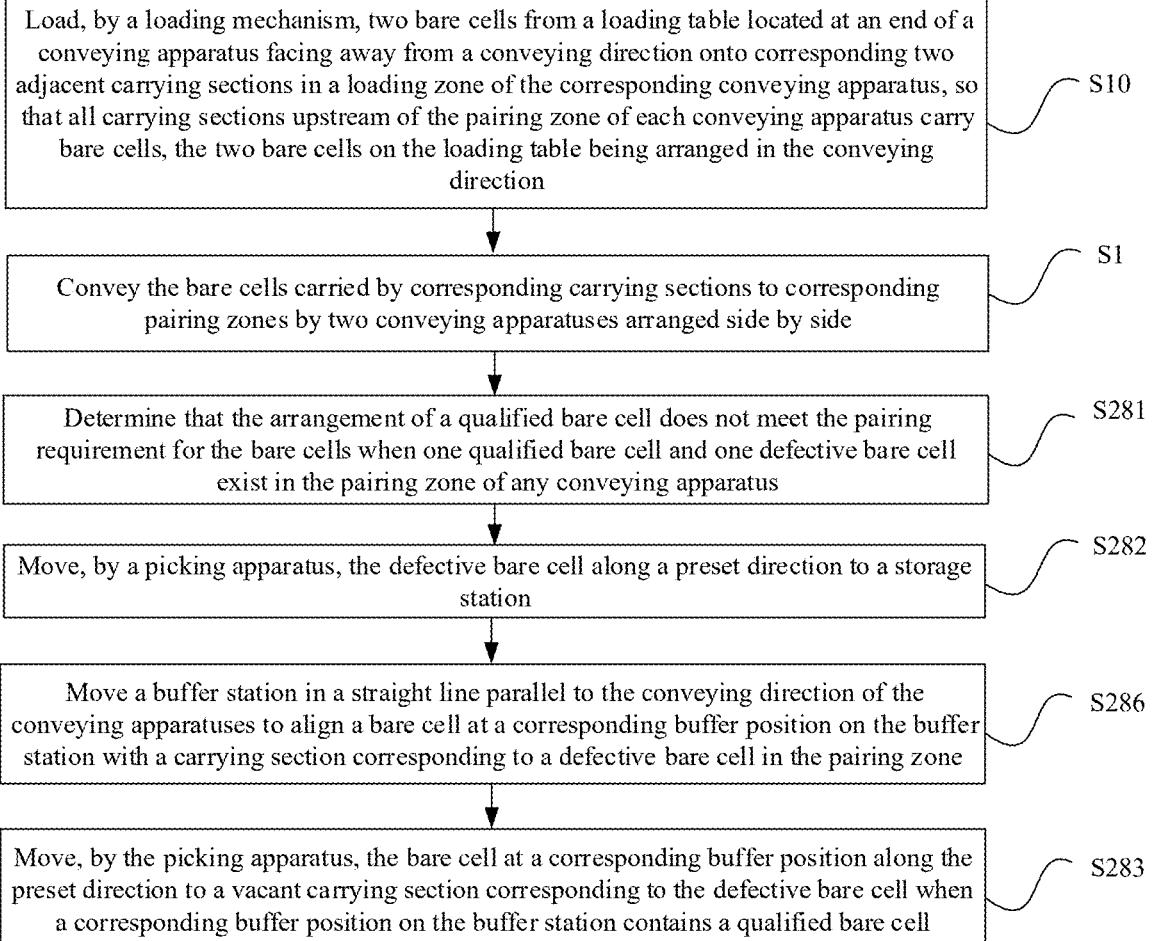

Load, by a loading mechanism, two bare cells from a loading table located at an end of a conveying apparatus facing away from a conveying direction onto corresponding two adjacent carrying sections in a loading zone of the corresponding conveying apparatus, so that all carrying sections upstream of the pairing zone of each conveying apparatus carry bare cells, the two bare cells on the loading table being arranged in the conveying direction — S10

Convey the bare cells carried by corresponding carrying sections to corresponding pairing zones by two conveying apparatuses arranged side by side — S1

Determine that the arrangement of a qualified bare cell does not meet the pairing requirement for the bare cells when one qualified bare cell and one defective bare cell exist in the pairing zone of any conveying apparatus — S281

Move, by a picking apparatus, the defective bare cell along a preset direction to a storage station — S282

Move a buffer station in a straight line parallel to the conveying direction of the conveying apparatuses to align a bare cell at a corresponding buffer position on the buffer station with a carrying section corresponding to a defective bare cell in the pairing zone — S286

Move, by the picking apparatus, the bare cell at a corresponding buffer position along the preset direction to a vacant carrying section corresponding to the defective bare cell when a corresponding buffer position on the buffer station contains a qualified bare cell — S283

FIG. 20

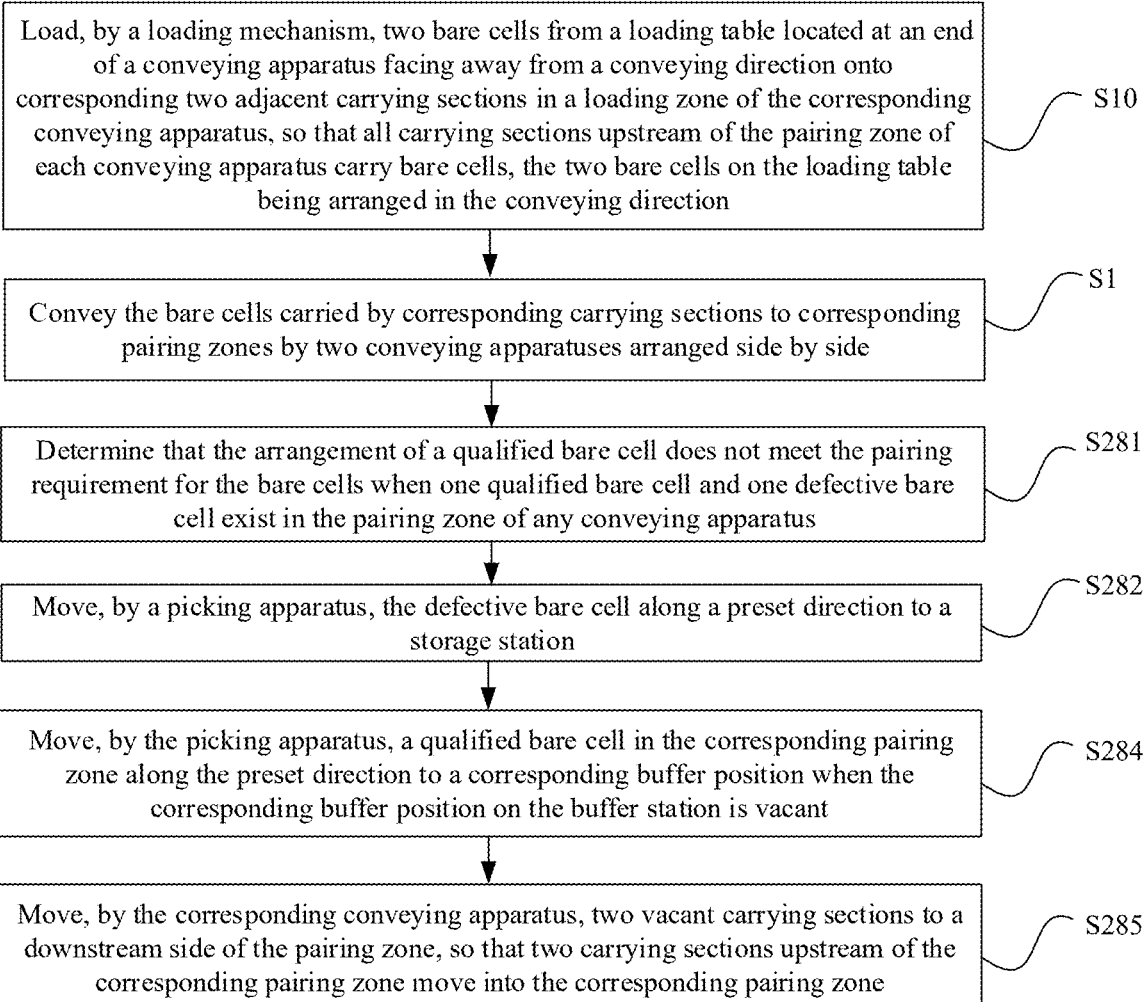

Load, by a loading mechanism, two bare cells from a loading table located at an end of a conveying apparatus facing away from a conveying direction onto corresponding two adjacent carrying sections in a loading zone of the corresponding conveying apparatus, so that all carrying sections upstream of the pairing zone of each conveying apparatus carry bare cells, the two bare cells on the loading table being arranged in the conveying direction — S10

Convey the bare cells carried by corresponding carrying sections to corresponding pairing zones by two conveying apparatuses arranged side by side — S1

Determine that the arrangement of a qualified bare cell does not meet the pairing requirement for the bare cells when one qualified bare cell and one defective bare cell exist in the pairing zone of any conveying apparatus — S281

Move, by a picking apparatus, the defective bare cell along a preset direction to a storage station — S282

Move, by the picking apparatus, a qualified bare cell in the corresponding pairing zone along the preset direction to a corresponding buffer position when the corresponding buffer position on the buffer station is vacant — S284

Move, by the corresponding conveying apparatus, two vacant carrying sections to a downstream side of the pairing zone, so that two carrying sections upstream of the corresponding pairing zone move into the corresponding pairing zone — S285

FIG. 21

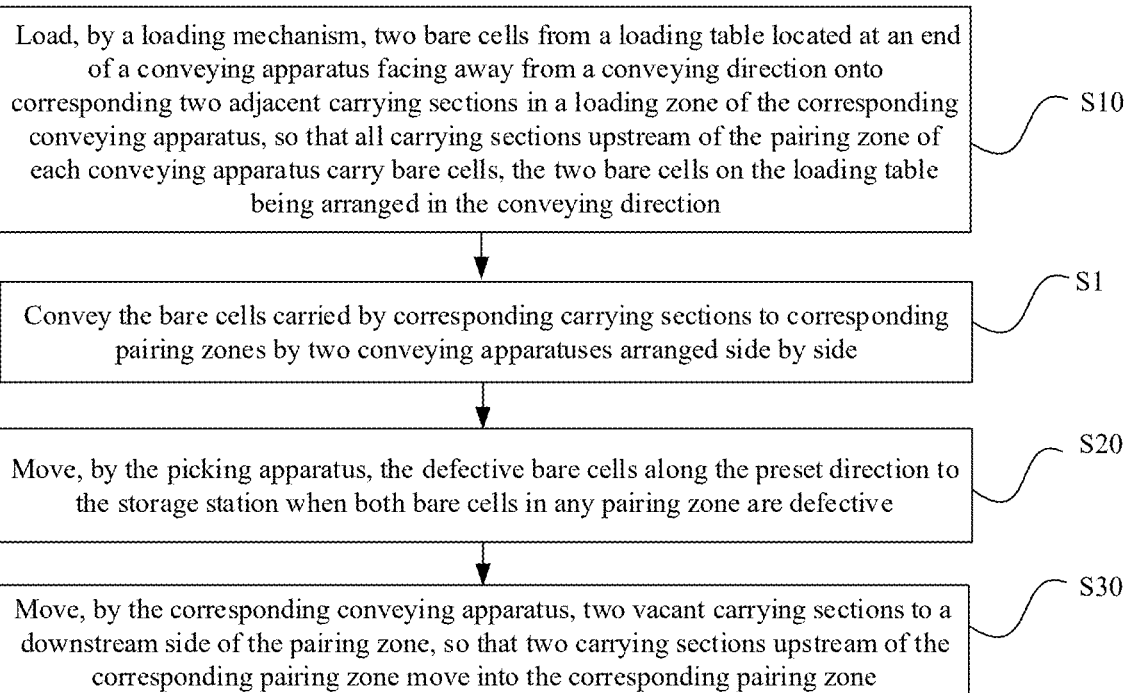

Load, by a loading mechanism, two bare cells from a loading table located at an end of a conveying apparatus facing away from a conveying direction onto corresponding two adjacent carrying sections in a loading zone of the corresponding conveying apparatus, so that all carrying sections upstream of the pairing zone of each conveying apparatus carry bare cells, the two bare cells on the loading table being arranged in the conveying direction    S10

Convey the bare cells carried by corresponding carrying sections to corresponding pairing zones by two conveying apparatuses arranged side by side    S1

Move, by the picking apparatus, the defective bare cells along the preset direction to the storage station when both bare cells in any pairing zone are defective    S20

Move, by the corresponding conveying apparatus, two vacant carrying sections to a downstream side of the pairing zone, so that two carrying sections upstream of the corresponding pairing zone move into the corresponding pairing zone    S30

FIG. 22

METHOD AND SYSTEM FOR PAIRING BARE CELLS

CROSS-REFERENCE TO RELATED APPLICATIONS

This application is a continuation of International application PCT/CN2024/097528 filed on Jun. 5, 2024 that claims priority to Chinese Patent Application No. 202410295777.9, filed on Mar. 15, 2024. The content of these applications is incorporated herein by reference in its entirety.

TECHNICAL FIELD

This disclosure relates to the field of battery technologies, and more particularly, to a method and system for pairing bare cells.

BACKGROUND

Applications of new energy batteries in daily life and industry are becoming increasingly widespread. For example, new energy vehicles equipped with batteries have been widely used. In addition, batteries are being increasingly applied in fields such as energy storage.

A battery cell includes a housing, a top cover disposed on the housing, and a bare cell disposed within the housing. Some battery cells contain paired bare cells within the housing. Before the bare cells are placed into the housing, pairing of the bare cells is required to match bare cells that can be placed into the housing as pairs.

SUMMARY

To address the above technical problems, this disclosure provides a method and system for pairing bare cells to achieve pairing of bare cells.

This disclosure is implemented through the following technical solutions.

According to a first aspect, an embodiment of this disclosure provides a method for pairing bare cells, including:

loading bare cells onto a loading zone of each of two conveying apparatuses arranged side by side, at least two carrying sections being provided in the loading zone of each conveying apparatus;

conveying the bare cells carried by corresponding carrying sections to corresponding pairing zones by the two conveying apparatuses arranged side by side, where a conveying direction of the conveying apparatuses is arranged to intersect with a preset direction, the preset direction is a direction in which the two conveying apparatuses are arranged side by side, tabs of the bare cells on the two conveying apparatuses are different in arrangement, and two carrying sections are provided in the pairing zone of each conveying apparatus; and pairing: when the arrangement of qualified bare cells does not meet a pairing requirement for the bare cells, picking up, by a picking apparatus, a corresponding qualified bare cell and moving the qualified bare cell along the preset direction between a buffer station and the carrying sections in a pairing zone of the conveying apparatus, enabling the bare cells in the pairing zone to meet the pairing requirement for the bare cells.

In this embodiment of this disclosure, the bare cells carried by the carrying sections are conveyed by the conveying apparatuses to the pairing zone for pairing. A corresponding qualified bare cell is picked up and moved by the picking apparatus along the preset direction between the buffer station and the carrying sections in a pairing zone of the conveying apparatus. Qualified bare cells in the pairing zone with the arrangement not meeting the pairing requirement may be moved to the buffer station for buffering and, under appropriate circumstances, moved back from the buffer station to the pairing zone for pairing, enabling the bare cells in the pairing zone to meet the pairing requirement for the bare cells and achieving pairing of the bare cells. This enables full utilization of the qualified bare cells in the pairing zone for pairing, improving the utilization rate of the qualified bare cells in the pairing zone. This facilitates compatibility with both pairing of two bare cells and pairing of four bare cells.

In an embodiment, one of the conveying apparatuses is a first conveying apparatus, and another of the conveying apparatuses is a second conveying apparatus. The loading bare cells onto the loading zone of each of the two conveying apparatuses arranged side by side, at least two carrying sections being provided in the loading zone of each conveying apparatus, further includes:

spaced every two carrying sections of the first conveying apparatus, loading, by a corresponding loading mechanism, two bare cells from a loading table located at an end of the conveying apparatus facing away from the conveying direction onto corresponding two adjacent carrying sections in the loading zone of the first conveying apparatus, the two bare cells on the loading table being arranged in the conveying direction; and spaced every one carrying section of the second conveying apparatus, loading one bare cell from the loading table located at the end of the conveying apparatus facing away from the conveying direction onto a target carrying section via a side of the corresponding loading mechanism facing away from the conveying direction, the target carrying section being one of two adjacent carrying sections in the loading zone of the second conveying apparatus, with the carrying section facing away from the corresponding conveying direction.

In this embodiment of this disclosure, the correspondence between the bare cells loaded by the loading mechanism and the carrying sections allows the loading mechanism to operate within a smaller range, facilitating space savings.

In an embodiment, the conveying the bare cells carried by corresponding carrying sections to corresponding pairing zones by the two conveying apparatuses arranged side by side includes:

moving two adjacent bare cells to a first pairing zone by the first conveying apparatus, the first pairing zone being the pairing zone corresponding to the first conveying apparatus; and moving one bare cell to a second pairing zone by the second conveying apparatus, where a carrying section with the bare cell in the second pairing zone is located on a side of another carrying section facing away from the corresponding conveying direction, and the second pairing zone is a pairing zone corresponding to the second conveying apparatus.

In this embodiment of this disclosure, arranging two bare cells in the first pairing zone and positioning the carrying section with the bare cell in the second pairing zone on the side of another carrying section facing away from the corresponding conveying direction ensure that the overall arrangement of the bare cells in the first pairing zone and the bare cell in the second pairing zone is substantially consistent with the overall arrangement of the bare cells in the loading zone of the first conveying apparatus and the bare cell in the loading zone of the second conveying apparatus. When the conveying apparatuses move a fixed distance each time, consistency in the arrangement of the bare cells moved into the pairing zones is improved.

In an embodiment, the pairing step includes:

determining that the arrangement of qualified bare cells does not meet the pairing requirement for the bare cells when two qualified bare cells are provided in the first pairing zone and one of the qualified bare cells is a first bare cell, the first bare cell being aligned with a qualified bare cell in the second pairing zone; and moving, by the picking apparatus, the first bare cell along the preset direction to the buffer station, enabling the bare cells in the pairing zone to meet the pairing requirement for the bare cells.

In this embodiment of this disclosure, since both bare cells in the first pairing zone are qualified, moving the aligned first bare cell is moved to the buffer station for buffering allows pairing of the qualified bare cell in the second pairing zone with the remaining qualified bare cell in the first pairing zone into a pair of two bare cells, as long as the bare cell in the second pairing zone is qualified, achieving pairing of two bare cells.

In an embodiment, the pairing step further includes:

moving, by the two conveying apparatuses, two carrying sections in the pairing zone corresponding to each conveying apparatus to a downstream side of the corresponding pairing zone when the bare cells in the pairing zone meet the pairing requirement for the bare cells, so that both carrying sections in the first pairing zone are vacant and one of two carrying sections in the second pairing zone carries a bare cell;

moving the buffer station in a straight line parallel to the conveying direction of the conveying apparatuses to bring the first bare cell on the buffer station to a position offset from the bare cell in the second pairing zone;

moving, by the picking apparatus, the first bare cell offset from the bare cell in the second pairing zone along the preset direction from the buffer station to a vacant carrying section in the first pairing zone; and determining that the bare cells in the pairing zone meet the pairing requirement for the bare cells when the bare cell in the second pairing zone is offset from the first bare cell moved from the buffer station to the first pairing zone and the bare cell in the second pairing zone is qualified.

In this embodiment of this disclosure, qualified bare cells on the buffer station fully utilize the two vacant carrying sections for pairing, improving pairing efficiency.

In an embodiment, defective bare cells are stored at a storage station. The pairing step includes:

determining that the arrangement of the qualified bare cell does not meet the pairing requirement for the bare cells when one qualified bare cell and one defective bare cell exist in the first pairing zone and the qualified bare cell is a first bare cell, the first bare cell being aligned with a qualified bare cell in the second pairing zone;

moving, by the picking apparatus, the defective bare cell along the preset direction to the storage station;

moving, by the picking apparatus, the first bare cell along the preset direction to the buffer station;

moving the buffer station in a straight line parallel to the conveying direction of the conveying apparatuses to bring the first bare cell on the buffer station to a position offset from the qualified bare cell in the second pairing zone; and moving, by the picking apparatus, the first bare cell offset from the qualified bare cell in the second pairing zone along the preset direction from the buffer station to a carrying section in the first pairing zone, enabling the bare cells in the pairing zone to meet the pairing requirement for the bare cells.

In this embodiment of this disclosure, movement of the buffer station is utilized to change a position of the first bare cell, achieving pairing of the qualified bare cells in the pairing zone.

In an embodiment, defective bare cells are stored at a storage station. The method further includes:

moving, by the picking apparatus, the defective bare cell in the first pairing zone along the preset direction to the storage station when a qualified bare cell in the first pairing zone is offset from a qualified bare cell in the second pairing zone and a defective bare cell exists in the first pairing zone, enabling the bare cells in the pairing zone to meet the pairing requirement for the bare cells.

In this embodiment of this disclosure, removing the defective bare cell from the pairing zone allows the remaining qualified bare cells to be paired into a pair of two bare cells.

In an embodiment, the loading bare cells onto the loading zone of each of the two conveying apparatuses arranged side by side, at least two carrying sections being provided in the loading zone of each conveying apparatus, further includes:

loading, by a loading mechanism, two bare cells from a loading table located at an end of the conveying apparatus facing away from the conveying direction onto corresponding two adjacent carrying sections in the loading zone of the corresponding conveying apparatus, so that all carrying sections upstream of the pairing zone of each conveying apparatus carry bare cells, the two bare cells on the loading table being arranged in the conveying direction.

In this embodiment of this disclosure, all carrying sections upstream of the pairing zone of each conveying apparatus carry bare cells, and each pairing zone can have two bare cells for pairing, enabling effective pairing of four bare cells into pairs. All carrying sections upstream of the pairing zone of each conveying apparatus carrying bare cells allow the loading mechanism to move within a smaller range, facilitating space savings.

In an embodiment, defective bare cells are stored at a storage station. The pairing step includes:

determining that the arrangement of the qualified bare cell does not meet the pairing requirement for the bare cells when one qualified bare cell and one defective bare cell exist in the pairing zone of any conveying apparatus;

moving, by the picking apparatus, the defective bare cell along the preset direction to the storage station; and moving, by the picking apparatus, the bare cell at a corresponding buffer position along the preset direction to a vacant carrying section corresponding to the defective bare cell when the corresponding buffer position on the buffer station contains a qualified bare cell.

In this embodiment of this disclosure, moving the defective bare cell in the pairing zone to the storage station for storage along the preset direction by the picking apparatus and replacing the defective bare cell with a qualified bare cell from the buffer station at a position of the defective bare cell in the pairing zone ensure that two bare cells in the pairing zone of each of the two conveying apparatuses are qualified, meeting the pairing requirement for the bare cells. This allows two qualified bare cells in the pairing zone of one conveying apparatus and two qualified bare cells in the pairing zone of another conveying apparatus to be paired into a pair of four bare cells, achieving pairing of four bare cells.

In an embodiment, the pairing step further includes:

moving, by the picking apparatus, a qualified bare cell in the corresponding pairing zone along the preset direction to a corresponding buffer position when the corresponding buffer position on the buffer station is vacant; and moving, by the corresponding conveying apparatus, two vacant carrying sections to a downstream side of the pairing zone, so that two carrying sections upstream of the corresponding pairing zone move into the corresponding pairing zone.

In this embodiment of this disclosure, moving, by the picking apparatus, a defective bare cell in the pairing zone to the storage station leaves no corresponding qualified bare cell on the buffer station for replacement, making the remaining qualified bare cell in the corresponding pairing zone unable to meet the pairing requirement for the bare cells. Moving by the picking apparatus the remaining qualified bare cell in the corresponding pairing zone to the corresponding buffer position on the buffer station for buffering and moving the upstream carrying sections into the pairing zone allow the qualified bare cell to be moved back from the buffer station to the pairing zone for pairing under suitable conditions in a subsequent pairing process. This ensures full utilization of the qualified bare cell for pairing, improving the utilization rate of the qualified bare cells.

In an embodiment, the pairing step further includes:

moving the buffer station in a straight line parallel to the conveying direction of the conveying apparatuses to align a bare cell at a corresponding buffer position on the buffer station with a carrying section corresponding to a defective bare cell in the pairing zone.

In this embodiment of this disclosure, moving the buffer station in a straight line parallel to the conveying direction of the conveying apparatuses aligns the corresponding buffer position with the corresponding carrying section, facilitating movement of a qualified bare cell at the corresponding buffer position in the preset direction back to the carrying section corresponding to the defective bare cell in the pairing zone by the picking apparatus. This replaces the defective bare cell in the corresponding pairing zone with the qualified bare cell on the buffer station, ensuring that two bare cells in the pairing zone of each conveying apparatus are qualified.

In an embodiment, defective bare cells are stored at a storage station. The method further includes:

moving, by the picking apparatus, the defective bare cells along the preset direction to the storage station when both bare cells in any pairing zone are defective; and moving, by the corresponding conveying apparatus, two vacant carrying sections to a downstream side of the pairing zone, so that two carrying sections upstream of the corresponding pairing zone move into the corresponding pairing zone.

In this embodiment of this disclosure, when both bare cells in any pairing zone are defective, moving, by the picking apparatus, all defective bare cells in the pairing zone to the storage station leaves both carrying sections in the pairing zone vacant, making pairing difficult. Moving the two vacant carrying sections to the downstream side of the pairing zone by the corresponding conveying apparatus allows two carrying sections upstream of the corresponding pairing zone to move into the corresponding pairing zone for further pairing.

In an embodiment, each conveying apparatus moves a distance corresponding to two carrying sections each time, so that during each movement, each conveying apparatus moves two carrying sections to the downstream side of the pairing zone and moves two carrying sections upstream of the pairing zone into the pairing zone.

In this embodiment of this disclosure, whether pairing two bare cells or four bare cells, each pairing zone requires two carrying sections, and correspondingly, each loading zone requires two carrying sections. Moving a distance corresponding to two carrying sections each time by each conveying apparatus ensures that the arrangement of bare cells carried by the two carrying sections moved into the pairing zone remains substantially unchanged, facilitating stable pairing of the bare cells.

According to a second aspect, an embodiment of this disclosure provides a system for pairing bare cells, including:

at least two conveying apparatuses, where a direction in which the at least two conveying apparatuses are arranged side by side is a preset direction, the preset direction is arranged to intersect with a conveying direction of the conveying apparatuses, each conveying apparatus is formed with a loading zone, a pairing zone, and a plurality of carrying sections for carrying bare cells, the plurality of carrying sections are arranged in the corresponding conveying direction, a span of the loading zone in the conveying direction and a span of the pairing zone in the conveying direction both are greater than a span of two carrying sections in the conveying direction, and the conveying apparatuses are capable of driving the plurality of carrying sections to sequentially pass through the loading zone and the pairing zone;

a buffer station, located on a side of one conveying apparatus facing away from another conveying apparatus along the preset direction, where the buffer station is capable of moving in a straight line parallel to the conveying direction of the conveying apparatuses, and the buffer station is configured to store qualified bare cells; and a picking apparatus, at least configured to pick up a qualified bare cell for reciprocal movement along the preset direction between the buffer station and the pairing zone, where the picking apparatus is capable of independently picking up two bare cells arranged in the conveying direction of the conveying apparatuses and moving the two bare cells together.

In this embodiment of this disclosure, qualified bare cells in the pairing zone are buffered at the buffer station, so that positions of the bare cells on the conveying apparatuses are adjusted, effectively achieving pairing of the bare cells.

In an embodiment, the system further includes a storage station, where the storage station is located on a side of the buffer station facing away from the conveying apparatuses along the preset direction, the picking apparatus is configured to move reciprocally along the preset direction at least between the buffer station, the pairing zone, and the storage station, and the storage station is configured to store defective bare cells.

In this embodiment of this disclosure, moving the picking apparatus between the pairing zone and the storage station allows defective bare cells in the pairing zone to be removed from the pairing zone and moved to the storage station for storage. This facilitates subsequent unified collection and processing of the defective bare cells on the storage station. Storing defective bare cells at the storage station and buffering qualified bare cells at the buffer station separate the qualified bare cells from the defective bare cells, reducing a possibility of confusion between the qualified bare cells and the defective bare cells.

In an embodiment, the system further includes a loading mechanism, an image capture device, a loading table, and an adjustment apparatus, where each conveying apparatus has a loading zone and an inspection zone, two carrying sections in the loading zone and two carrying sections in the inspection zone are sequentially and adjacently arranged in the conveying direction of the conveying apparatus, the pairing zone is located downstream of the corresponding inspection zone, the image capture device is located above the conveying apparatus to capture images of the bare cells on the conveying apparatus, a projection area of the image capture device in a vertical direction is within a projection area of the inspection zone in the vertical direction, the loading table is located at an end of the conveying apparatus facing away from the conveying direction of the conveying apparatus, the adjustment apparatus is located at an end of the loading table facing away from the conveying direction of the conveying apparatus, the adjustment apparatus is configured to adjust a state of the bare cells, the loading mechanism is capable of independently picking up two bare cells arranged in the conveying direction of the conveying apparatus and moving the two bare cells together, and the loading mechanism is configured to load the bare cells on the loading table onto the carrying sections in the loading zone of the conveying apparatus.

In this embodiment of this disclosure, two carrying sections in the loading zone, two carrying sections in the inspection zone, and two carrying sections in the pairing zone are sequentially and adjacently arranged in the conveying direction of the conveying apparatus. The carrying sections in different functional areas on the conveying apparatus are sequentially and adjacently arranged, making an overall structure of the conveying apparatus more compact and saving space occupied by the conveying apparatus. The loading mechanism can move within a spaced area between the image capture device and the adjustment apparatus along the conveying direction of the conveying apparatus to pick up the bare cells on the loading table and load the bare cells onto the carrying sections in the loading zone. Adjusting a state of the bare cells by the adjustment apparatus before the bare cells move to the loading table allows the loading table to receive the bare cells in a required state.

Effects of the Invention

In the embodiments of this disclosure, the bare cells carried by the carrying sections are conveyed by the conveying apparatuses to the pairing zone for pairing. A corresponding qualified bare cell is picked up and moved by the picking apparatus along the preset direction between the buffer station and the carrying sections in a pairing zone of the conveying apparatus. Qualified bare cells in the pairing zone with the arrangement not meeting the pairing requirement can be moved to the buffer station for buffering and, under appropriate circumstances, moved back from the buffer station to the pairing zone for pairing, so that positions of the qualified bare cells are adjusted through the buffer station, enabling the bare cells in the pairing zone to meet the pairing requirement for the bare cells and achieving pairing of the bare cells. This enables full utilization of the qualified bare cells in the pairing zone for pairing, improving the utilization rate of the qualified bare cells in the pairing zone.

BRIEF DESCRIPTION OF DRAWINGS

Other advantages and benefits will become apparent to those of ordinary skill in the art by reading the following detailed descriptions of exemplary implementations. The accompanying drawings are merely intended to illustrate the purposes of the preferred implementations, and should not be construed as a limitation on this disclosure. In addition, in all the accompanying drawings, same parts are denoted by same reference signs. In the accompanying drawings:

FIG. 15 shows an arrangement diagram of a first conveying apparatus, a loading mechanism, and an image capture device according to an embodiment of this disclosure;

FIG. 16 shows a first flowchart of a method for pairing bare cells according to an embodiment of this disclosure;

FIG. 17 shows a second flowchart of a method for pairing bare cells according to an embodiment of this disclosure;

FIG. 18 shows a third flowchart of a method for pairing bare cells according to an embodiment of this disclosure;

FIG. 19 shows a fourth flowchart of a method for pairing bare cells according to an embodiment of this disclosure;

FIG. 20 shows a fifth flowchart of a method for pairing bare cells according to an embodiment of this disclosure;

FIG. 21 shows a sixth flowchart of a method for pairing bare cells according to an embodiment of this disclosure; and FIG. 22 shows a seventh flowchart of a method for pairing bare cells according to an embodiment of this disclosure.

DESCRIPTION OF REFERENCE NUMERALS

Figure 1:
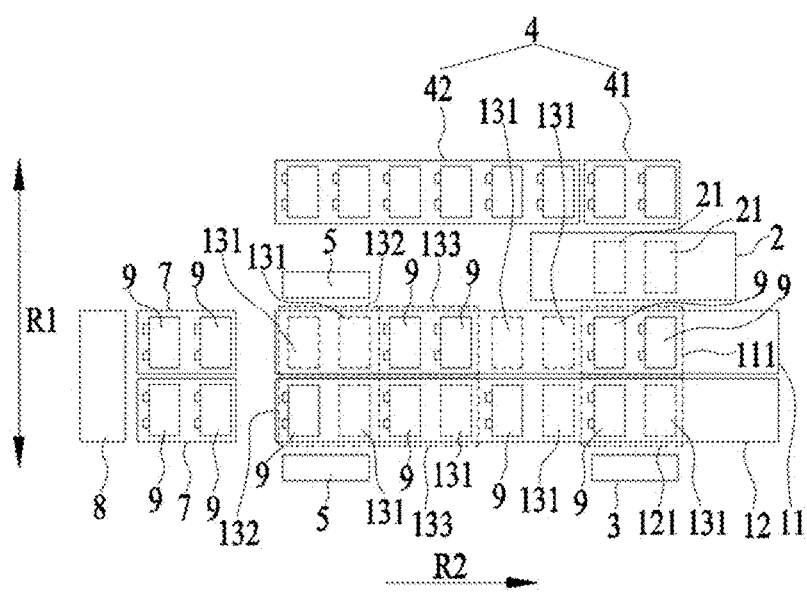
FIG. 1 is a schematic structural diagram of a system for pairing bare cells according to an embodiment of this disclosure, where the figure shows a state where pairing zones of two conveying apparatuses are prepared for pairing two bare cells, and whether two bare cells in a first pairing zone are qualified is determined based on actual conditions.

11. first conveying apparatus; 111. first pairing zone; 12. second conveying apparatus; 121. second pairing zone; 131. carrying section; 132. loading zone; 133. inspection zone; 2. buffer station; 21. buffer position; 3. picking apparatus; 4. storage station; 41. elevator; 42. storage conveyor; 5. loading mechanism; 6. image capture device; 7. loading table; 8. adjustment apparatus; and 9. bare cell.

DETAILED DESCRIPTION

Embodiments of the technical solutions of this disclosure are described in detail below with reference to the accompanying drawings. The following embodiments are merely used to illustrate the technical solutions of this disclosure more clearly and are only examples, not intended to limit the scope of protection of this disclosure.

Unless otherwise defined, all technical and scientific terms used herein shall have the same meanings as commonly understood by those skilled in the art to which this disclosure relates. The terms used herein are intended to merely describe the specific embodiments rather than to limit this disclosure. The terms "include", "comprise", "have", and any other variations thereof in this disclosure are intended to cover non-exclusive inclusions.

In the description of the embodiments of this disclosure, technical terms such as "first," "second," and "third" are used only to distinguish different objects and should not be construed as indicating or implying relative importance or implying a number, specific order, or primary-secondary relationship of the indicated technical features. In the description of the embodiments of this disclosure, "a plurality of" means two or more, unless explicitly and specifically defined otherwise.

Reference to "embodiment" herein means that a specific feature, structure, or characteristic described in conjunction with the embodiment may be included in at least one embodiment of this disclosure. The appearance of this phrase at various places in the specification does not necessarily refer to the same embodiment, nor is the embodiment an independent or alternative embodiment mutually exclusive with other embodiments. Persons skilled in the art explicitly and implicitly understand that the embodiments described herein may be combined with another embodiment.

In the description of the embodiments of this disclosure, the term "and/or" is only an associative relationship for describing associated objects, indicating that three relationships may be present. For example, A and/or B may indicate three cases: presence of only A; presence of both A and B; and presence of only B. In addition, the character "/" in this application generally indicates an "or" relationship between the contextually associated objects.

In the description of the embodiments of this disclosure, unless otherwise specified and defined explicitly, the terms "mounting", "connection", "join", and "fastening" should be understood in their general senses. For example, the connection may be a fixed connection, a removable connection, or an integral connection; may be a mechanical connection, an electrical connection, or mutual communication; may be a direct connection or an indirect connection by using an intermediate medium; or may be intercommunication between two components or interaction between two components. Persons of ordinary skill in the art can understand specific meanings of these terms in the embodiments of this disclosure based on specific circumstances.

In the description of the embodiments of this disclosure, unless explicitly specified and limited otherwise, the technical term "contact" should be broadly understood. The term may refer to direct contact or contact via an intermediate medium layer, contact between two entities with substantially no interaction force, or contact between two entities with an interaction force.

Currently, applications of new energy batteries in daily life and industry are becoming increasingly widespread. New energy batteries are not only applied to energy storage power systems such as hydroelectric, thermal, wind, and solar power plants but are also widely used in electric transportation vehicles such as electric bicycles, electric motorcycles, and electric cars, as well as in aerospace and other fields. With the continuous expansion of application fields of power batteries, market demand for power batteries is also continuously increasing.

In an embodiment of this disclosure, a corresponding qualified bare cell is picked up and moved by a picking apparatus along a preset direction between a buffer station and carrying sections of a pairing zone of a conveying apparatus, changing the arrangement of qualified bare cells in the pairing zone of the conveying apparatus to obtain bare cells meeting a pairing requirement, thereby achieving pairing of the bare cells. Temporarily storing the bare cells at the buffer station enables full utilization of each qualified bare cell for pairing, improving the utilization rate of the qualified bare cells.

Drawings of the embodiments of this disclosure illustrate carrying sections of the conveying apparatus, indicating that the carrying sections of the conveying apparatus are vacant in the illustrated state. Drawings of the embodiments of this disclosure illustrate bare cells on the conveying apparatus, indicating that the bare cells on the conveying apparatus are carried by the corresponding carrying sections of the conveying apparatus in the illustrated state.

Drawings of the embodiments of this disclosure illustrate buffer positions of the buffer station, indicating that the buffer positions of the buffer station are vacant in the illustrated state. Drawings of the embodiments of this disclosure illustrate buffer positions of the buffer station, indicating that the buffer positions of the buffer station are vacant in the illustrated state. Drawings of the embodiments of this disclosure illustrate bare cells on the buffer station, indicating that the bare cells on the buffer station are located at the corresponding buffer positions in the illustrated state.

A bare cell is an important component of a battery cell.

Battery cells may be provided in plurality, and a plurality of battery cells may be connected in series, in parallel, or in a hybrid manner, the hybrid manner referring to a combination of both series and parallel connections among the plurality of battery cells. A plurality of battery cells may be directly connected in series, in parallel, or in a hybrid manner to form a battery pack. Alternatively, a plurality of battery cells may first be connected in series, in parallel, or in a hybrid manner to form battery modules, and a plurality of battery modules may then be connected in series, in parallel, or in a hybrid manner to form a battery pack. The battery pack may further include other structures, for example, the battery pack may further include a busbar component for achieving electrical connection between the plurality of battery cells.

A battery cell refers to a basic unit capable of converting chemical energy and electrical energy into each other.

In an embodiment of this disclosure, the battery cell may be a lithium-ion battery, a sodium-ion battery, a sodium-lithium-ion battery, a lithium metal battery, a sodium metal battery, a lithium-sulfur battery, a magnesium-ion battery, a nickel-hydrogen battery, a nickel-cadmium battery, a lead-acid battery, or the like, and the embodiment of this disclosure does not limit the type of the battery cell.

A bare cell may be formed by winding or stacking electrode plates.

An electrode plate includes a current collector and an active material disposed on at least one surface of the current collector.

The current collector has an overall sheet-like structure and is capable of being wound.

The current collector may be a metal foil or a composite current collector.

For example, a material of the metal foil may be stainless steel, copper, aluminum, nickel, or titanium.

For example, the composite material is a combination of a metal material and a polymer substrate.

A battery cell in an embodiment of this disclosure includes a housing, a top cover disposed on the housing, and a bare cell disposed within the housing. Bare cells within the housing are arranged in pairs.

For example, paired bare cells within the housing are welded to an adapting sheet, and the adapting sheet is welded to a terminal post on the top cover. Charging of the bare cells within the housing is performed via the terminal post, or discharging of the bare cells within the housing is performed externally via the terminal post.

Paired bare cells within the housing are arranged according to actual needs.

For example, paired bare cells within the housing may be two bare cells paired together.

For example, paired bare cells within the housing may be four bare cells paired together.

An embodiment of this disclosure provides a system for pairing bare cells 9. Referring to FIG. 1 to FIG. 14, the system includes conveying apparatuses, a buffer station 2, and a picking apparatus 3. At least two conveying apparatuses are provided. A direction in which the at least two conveying apparatuses are arranged side by side is a preset direction. The preset direction is arranged to intersect with a conveying direction of the conveying apparatuses. Each conveying apparatus is formed with a loading zone 132, a pairing zone, and a plurality of carrying sections 131 for carrying bare cells 9. The plurality of carrying sections 131 are arranged in the corresponding conveying direction. A span of the loading zone 132 in the conveying direction and a span of the pairing zone in the conveying direction both are greater than a span of two carrying sections 131 in the conveying direction. The conveying apparatuses are capable of driving the plurality of carrying sections 131 to sequentially pass through the loading zone and the pairing zone. The buffer station 2 is located on a side of one conveying apparatus facing away from another conveying apparatus along the preset direction, and the buffer station 2 is configured to move in a straight line parallel to the conveying direction of the conveying apparatuses. The picking apparatus 3 is configured to move reciprocally along the preset direction at least between the buffer station 2 and the pairing zone, and the picking apparatus 3 is capable of independently picking up two bare cells 9 arranged in the conveying direction of the conveying apparatuses and moving the two bare cells 9 together.

The conveying apparatuses convey the bare cells 9 carried on the carrying sections 131 by driving the carrying sections 131 to move.

For example, each conveying apparatus includes a conveying body and a tray disposed on the conveying body, and the carrying sections 131 are formed on the tray.

For example, a conveying method of the conveying body may be belt-driven conveyance or chain-driven conveyance.

The buffer station 2 is a structure configured to buffer bare cells 9. Qualified bare cells 9 in the pairing zone of the conveying apparatus may be placed onto the buffer station 2 according to actual needs, and qualified bare cells 9 placed on the buffer station 2 may be returned to a required position in the pairing zone according to actual needs.

For example, the buffer station 2 may include a main table and a driver, and the main table is driven to move by the driver.

For example, the driver may be a linearly driven cylinder.

The picking apparatus 3 is a structure configured to pick up bare cells 9.

For example, the picking apparatus 3 may be a corresponding robotic arm, and the corresponding robotic arm is provided with two grippers arranged in the conveying direction of the conveying apparatuses, the two grippers being capable of independently gripping bare cells 9.

A specific structure of the picking apparatus 3 is not limited, as long as the picking apparatus 3 is capable of independently picking up two bare cells 9 arranged in the conveying direction of the conveying apparatuses and moving the two bare cells 9 together.

It can be understood that since the picking apparatus 3 is capable of independently picking up two bare cells 9, the picking apparatus 3 may grip one bare cell 9 according to actual needs.

For example, one gripper of the picking apparatus 3 grips one bare cell 9, while another gripper does not grip a bare cell.

It should be explained that when the picking apparatus 3 moves along the preset direction to the pairing zone, a projection area of the picking apparatus 3 in a vertical direction spans a projection area of two carrying sections 131 in the pairing zone in the vertical direction.

For example, referring to FIG. 1 to FIG. 13, a direction indicated by arrow R1 in the figures is the preset direction.

For example, referring to FIG. 1 to FIG. 15, a direction indicated by arrow R2 in the figures is the conveying direction of the conveying apparatuses.

It should be noted that the span of the loading zone 132 in the conveying direction and the span of the pairing zone in the conveying direction both are greater than the span of two carrying sections 131 in the conveying direction, and both the loading zone 132 and the pairing zone are capable of accommodating at least two carrying sections.

For example, a span of a first pairing zone 111 in the conveying direction is greater than the span of two carrying sections 131 in the conveying direction, and a span of a second pairing zone 121 in the conveying direction is greater than the span of two carrying sections 131 in the conveying direction.

In this embodiment of this disclosure, since the picking apparatus 3 is configured to move reciprocally along the preset direction at least between the buffer station 2 and the pairing zone, qualified bare cells 9 in the pairing zone with the arrangement not meeting the pairing requirement can be moved by the picking apparatus 3 to the buffer station 2 for buffering, and at an appropriate time, the qualified bare cells 9 on the buffer station 2 can be picked up by the picking apparatus 3 and returned to the pairing zone for pairing. This enables full utilization of the qualified bare cells 9 in the pairing zone for pairing, improving the utilization rate of the qualified bare cells 9 in the pairing zone. In addition, by moving the picking apparatus 3 along the preset direction and moving the buffer station 2 in a straight line parallel to the conveying direction of the conveying apparatuses, movement of the bare cells 9 is decomposed. Movement of the bare cells 9 along the preset direction is achieved by movement of the picking apparatus 3, and movement of the bare cells 9 in a straight line parallel to the conveying direction of the conveying apparatuses is achieved by the buffer station 2. The picking apparatus 3 only needs to move as a whole in the preset direction, facilitating simplification of a specific structure of the picking apparatus 3. The system in this embodiment of this disclosure buffers the qualified bare cells 9 in the pairing zone at the buffer station 2, thereby adjusting positions of the bare cells 9 on the conveying apparatuses and achieving better pairing of the bare cells 9.

It can be understood that the loading zone 132 having two carrying sections 131 capable of carrying bare cells 9 and the pairing zone having two carrying sections 131 capable of carrying bare cells 9 ensure that a quantity of carrying sections 131 capable of being loaded in the loading zone 132 is consistent with a quantity of carrying sections 131 capable of being paired in the pairing zone. This system can effectively accommodate pairing of two bare cells and pairing of four bare cells based on a limited number of pairing scenarios, reducing unpredictability in the arrangement of bare cells in the pairing zone.

It can be understood that buffering the qualified bare cells 9 at the buffer station 2 achieves better pairing of two bare cells 9 into a pair and better pairing of four bare cells 9 into a pair.

In an embodiment, referring to FIG. 1 to FIG. 14, the system further includes a storage station 4, where the storage station 4 is located on a side of the buffer station 2 facing away from the conveying apparatuses along the preset direction, the picking apparatus 3 is configured to move reciprocally along the preset direction at least between the buffer station 2, the pairing zone, and the storage station 4, and the storage station 4 is configured to store defective bare cells 9.

The storage station 4 is configured to store defective bare cells 9. Defective bare cells 9 in the pairing zone can be stored at the storage station 4.

For example, referring to FIG. 15, the storage station 4 includes an elevator 41 and storage conveyors 42. The elevator 41 is located on a side of the buffer station 2 facing away from the conveying apparatuses along the preset direction, and an area of the elevator 41 configured to place defective bare cells 9 is aligned with the pairing zone. The storage conveyors 42 are provided in plurality, and the plurality of storage conveyors 42 are arranged in a vertical direction.

Figure 14:
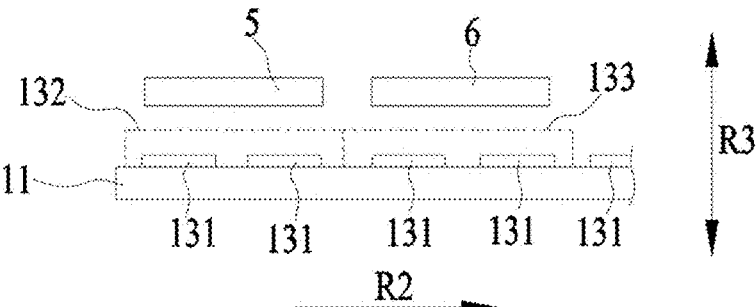
FIG. 14 shows a schematic structural diagram of a storage station according to an embodiment of this disclosure.

For example, referring to FIG. 14 and FIG. 15, a direction indicated by arrow R3 in the figures is the vertical direction.

For example, referring to FIG. 1 to FIG. 14, the storage conveyors 42 are located on a side of the elevator 41 facing away from the conveying direction of the conveying apparatuses.

For example, the storage conveyors 42 may be belt-driven devices.

For example, defective bare cells 9 on the elevator 41 may be grabbed onto the storage conveyors 42 by a robotic arm.

For example, the elevator 41 moves defective bare cells 9 on the elevator 41 along the vertical direction to a height corresponding to a respective storage conveyor 42, and the elevator 41 transfers the defective bare cells 9 on the elevator 41 to the storage conveyor 42 for storage in a belt-driven manner.

In an embodiment of this disclosure, moving the picking apparatus 3 between the pairing zone and the storage station 4 allows defective bare cells 9 in the pairing zone to be removed from the pairing zone and moved to the storage station 4 for storage. This facilitates subsequent unified collection and processing of the defective bare cells 9 on the storage station 4. Storing defective bare cells 9 at the storage station 4 and buffering qualified bare cells 9 at the buffer station 2 separate the qualified bare cells 9 from the defective bare cells 9, reducing a possibility of confusion between the qualified bare cells 9 and the defective bare cells 9.

In an embodiment, the system for pairing bare cells 9 further includes a controller, and movements of the conveying apparatuses, the buffer station 2, and the picking apparatus 3 are all controlled by the controller.

Figure 9:
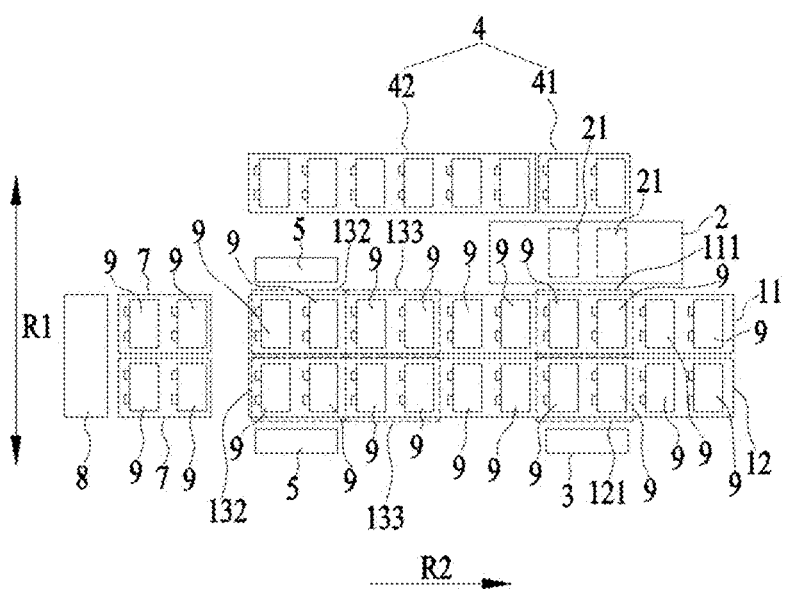
FIG. 9 is a schematic structural diagram of a system for pairing bare cells according to an embodiment of this disclosure, where the figure shows a state where pairing zones of two conveying apparatuses are prepared for pairing four bare cells, and whether two bare cells in a first pairing zone and two bare cells in a second pairing zone are qualified is determined based on actual conditions.

In an embodiment, referring to FIG. 1, FIG. 9, and FIG. 14, the system includes an image capture device 6, and images of bare cells 9 on the conveying apparatuses are captured by the image capture device 6.

It can be understood that an upper-level computer inspects images captured and sent by the image capture device 6 and sends inspection results to the controller.

For example, the image capture device 6 may be a camera.

For example, the upper-level computer recognizes the images to determine whether scratches or other appearance defects exist on the bare cells 9. If scratches or other defects exist, an inspection result of the corresponding bare cell 9 is defective; if no scratches or other defects exist, an inspection result of the corresponding bare cell 9 is qualified. Conditions for determining qualification or defectiveness may be set according to actual needs.

For example, the upper-level computer sends the inspection results of the images to the controller. The controller controls execution of corresponding actions based on the inspection results.

In this embodiment of this disclosure, capturing images by the image capture device 6 and uploading the images to the upper-level computer for inspection enable automatic inspection of the bare cells 9.

It can be understood that a specific inspection method for the bare cells 9 on the conveying apparatuses is not limited. For example, the bare cells 9 on the conveying apparatuses may be inspected by an operator.

In an embodiment, referring to FIG. 1 to FIG. 14, the system further includes a loading mechanism 5, the loading mechanism 5 being configured to load bare cells 9 onto the conveying apparatuses. The loading mechanism 5 is capable of independently picking up two bare cells 9 arranged in the conveying direction of the conveying apparatuses and moving the two bare cells 9 together.

For example, the loading mechanism 5 may be a corresponding robotic arm, and the corresponding robotic arm is provided with two corresponding grippers arranged in the conveying direction of the conveying apparatuses, the two corresponding grippers being capable of independently gripping bare cells 9.

A specific structure of the loading mechanism 5 is not limited, as long as the loading mechanism 5 is capable of independently picking up two bare cells 9 arranged in the conveying direction of the conveying apparatuses and moving the two bare cells 9 together.

It can be understood that since the loading mechanism 5 is capable of independently picking up two bare cells 9, the loading mechanism 5 may grip one bare cell 9 according to actual needs.

For example, one gripper of the loading mechanism 5 grips one bare cell 9, while another gripper does not grip a bare cell.

In this embodiment of this disclosure, loading by the loading mechanism 5 improves an automation level of loading in the entire system.

It can be understood that the loading method of the system is not limited and manual loading may be used.

In an embodiment, referring to FIG. 1 to FIG. 14, the system further includes a loading table 7, the loading table 7 being located at an end of the conveying apparatuses facing away from the conveying direction of the conveying apparatuses. Each conveying apparatus has a loading zone 132, and each loading zone 132 has two carrying sections 131. The loading mechanism 5 is configured to move bare cells 9 on the loading table 7 to the corresponding carrying sections 131 in the loading zone 132.

The loading table 7 is a structure configured to hold bare cells 9 to be loaded.

In this embodiment of this disclosure, the loading table 7 stores bare cells 9 to be loaded.

In an embodiment, referring to FIG. 1 to FIG. 14, the system further includes an adjustment apparatus 8. The adjustment apparatus 8 is located at an end of the loading table 7 facing away from the conveying direction of the conveying apparatuses. Each conveying apparatus has an inspection zone 133, two carrying sections 131 in the loading zone 132 and two carrying sections 131 in the inspection zone 133 are sequentially and adjacently arranged in the conveying direction of the conveying apparatus, the pairing zone is located downstream of the corresponding inspection zone 133, the image capture device 6 is located above the conveying apparatus to capture images of the bare cells 9 on the conveying apparatus, a projection area of the image capture device 6 in a vertical direction is within a projection area of the inspection zone 133 in the vertical direction, the adjustment apparatus 8 is configured to adjust a state of the bare cells 9, the loading mechanism 5 is configured to load the bare cells 9 on the loading table 7 onto the carrying sections 131 in the loading zone 132 of the conveying apparatus.

The adjustment apparatus 8 is configured to adjust a state of the bare cells 9 before the bare cells 9 move to the loading table 7.

Bare cells 9 loaded onto the loading zone 132 pass through the inspection zone 133, and images of the corresponding bare cells 9 are captured by the image capture device 6 and uploaded to the upper-level computer. The upper-level computer recognizes the images to inspect the bare cells 9. Bare cells 9, after images capture in the inspection zone 133 and being qualified after inspection are moved to the pairing zone for pairing.

For example, the adjustment apparatus 8 may change an orientation of a tab of a bare cell 9 to adjust a state of the bare cell 9.

For example, the adjustment apparatus 8 may change a spacing between two bare cells 9 arranged in the conveying direction of the conveying apparatuses to adjust a state of the bare cells 9.

For example, the loading table 7 carries two bare cells 9 arranged in the conveying direction of the conveying apparatuses.

For example, referring to FIG. 14, a projection area of the image capture device 6 in the vertical direction spans a projection area of two carrying sections 131 in the inspection zone 133 in the vertical direction.

For example, when the loading mechanism 5 moves to the loading zone 132, a projection area of the loading mechanism 5 in the vertical direction spans a projection area of two carrying sections 131 in the loading zone 132 in the vertical direction.

For example, referring to FIG. 1 to FIG. 14, two carrying sections 131 in the pairing zone are spaced from two carrying sections 131 in the corresponding inspection zone 133 by two carrying sections 131. An area between the pairing zone and the inspection zone 133 may be used to arrange other structures.

For example, two carrying sections 131 in the pairing zone and two carrying sections 131 in the inspection zone 133 may be adjacent.

In this embodiment of this disclosure, two carrying sections 131 in the loading zone 132, two carrying sections 131 in the inspection zone 133, and two carrying sections 131 in the pairing zone are sequentially and adjacently arranged in the conveying direction of the conveying apparatus. The carrying sections 131 in different functional areas on the conveying apparatus are sequentially and adjacently arranged, making an overall structure of the conveying apparatus more compact and saving space occupied by the conveying apparatus. The loading mechanism 5 can move within a spaced area between the image capture device 6 and the adjustment apparatus 8 along the conveying direction of the conveying apparatus to pick up the bare cells 9 on the loading table 7 and load the bare cells 9 onto the carrying sections 131 in the loading zone 132. Adjusting a state of the bare cells 9 by the adjustment apparatus 8 before the bare cells 9 move to the loading table 7 allows the loading table 7 to receive the bare cells 9 in a required state.

An embodiment of this disclosure provides a method for pairing bare cells 9. Referring to FIG. 1 to FIG. 7, FIG. 9 to FIG. 13, and FIG. 16, the method includes:

step S100: Load bare cells onto a loading zone of each of two conveying apparatuses arranged side by side, at least two carrying sections being provided in the loading zone of each conveying apparatus;

step S1: Convey the bare cells carried by corresponding carrying sections to corresponding pairing zones by the two conveying apparatuses arranged side by side;

step S2: Pairing: when the arrangement of qualified bare cells does not meet a pairing requirement for the bare cells, pick up, by a picking apparatus, a corresponding qualified bare cell and move the qualified bare cell along a preset direction between a buffer station and the carrying sections in a pairing zone of the conveying apparatus, enabling the bare cells in the pairing zone to meet the pairing requirement for the bare cells.

It should be explained that a conveying direction of the conveying apparatuses is arranged to intersect with the preset direction, the preset direction is a direction in which the two conveying apparatuses are arranged side by side, the arrangement of tabs of bare cells 9 on the two conveying apparatuses is different, and two carrying sections 131 are provided in the pairing zone of each conveying apparatus.

It should be noted that the arrangement of tabs of the bare cells 9 on the two conveying apparatuses being different means that, in an embodiment of this disclosure, pairing is performed on bare cells 9 with different tab arrangements. To meet the pairing requirement for the bare cells 9, each pairing zone of the conveying apparatuses has at least one qualified bare cell 9. The pairing requirement varies depending on different pairing scenarios.

For example, for a scenario of pairing two bare cells 9, the pairing requirement for the bare cells is at least that a number of qualified bare cells 9 in the pairing zone of one conveying apparatus is one, and a number of qualified bare cells 9 in the pairing zone of another conveying apparatus is one.

For example, when the number of bare cells 9 in the pairing zone is greater than one, the picking apparatus may be used to pick up a corresponding qualified bare cell and move the qualified bare cell along the preset direction between the buffer station and the carrying sections in a pairing zone of the conveying apparatus to remove excess bare cells 9.

For example, for a scenario of pairing four bare cells 9, the pairing requirement for the bare cells 9 is that two qualified bare cells are provided in the pairing zone of each of the two conveying apparatuses arranged side by side.

The carrying sections 131 gradually pass through the pairing zone under driving of the conveying apparatuses.

The bare cells 9 move accordingly through the pairing zone under driving of the carrying sections 131.

The picking apparatus 3 is used to pick up a corresponding qualified bare cell 9 and move the qualified bare cell 9 along the preset direction between the buffer station 2 and the carrying sections 131 in the pairing zone of the conveying apparatus, and the picking apparatus 3 moves substantially linearly between the buffer station 2 and the pairing zone.

For example, referring to FIG. 1 to FIG. 13, tabs of the bare cells 9 on each conveying apparatus are located on a side of the corresponding bare cell 9 facing away from the conveying direction of the conveying apparatus.

The arrangement of tabs of the bare cells 9 on the two conveying apparatuses is different.

For example, referring to FIG. 1 to FIG. 13, polarities of tabs on a side where the bare cell 9 on one conveying apparatus and the bare cell 9 on another conveying apparatus are close to each other in the preset direction are the same, and polarities of tabs on a side where the bare cell 9 on one conveying apparatus and the bare cell 9 on another conveying apparatus are away from each other in the preset direction are the same, so that the arrangement of tabs of the bare cells 9 on the two conveying apparatuses is different.

For example, referring to FIG. 1 to FIG. 13, a polarity of tabs on a side where the bare cell 9 on one conveying apparatus and the bare cell 9 on another conveying apparatus are close to each other in the preset direction is positive, and a polarity of tabs on a side where the bare cell 9 on one conveying apparatus and the bare cell 9 on another conveying apparatus are away from each other in the preset direction is negative. Specifically, in two tabs of the bare cell 9 on the conveying apparatus close to the buffer station 2 in the preset direction, a polarity of the tab close to the buffer station 2 is negative, and a polarity of the tab away from the buffer station 2 is positive; in two tabs of the bare cell 9 on the conveying apparatus away from the buffer station 2 in the preset direction, a polarity of the tab close to the buffer station 2 is positive, and a polarity of the tab away from the buffer station 2 is negative.

It should be noted that different distributions of tabs of different polarities on the bare cells 9 on the two conveying apparatuses facilitate subsequent corresponding processing of successfully paired bare cells 9 after pairing is completed on the two conveying apparatuses.

In this embodiment of this disclosure, the conveying apparatuses convey the bare cells 9 carried by the carrying sections 131 to the pairing zone for pairing. The picking apparatus 3 is used to pick up a corresponding qualified bare cell 9 and move the qualified bare cell 9 in the preset direction between the buffer station 2 and the carrying sections 131 in the pairing zone of the conveying apparatus. Qualified bare cells 9 in the pairing zone with the arrangement not meeting the pairing requirement can be moved to the buffer station 2 for buffering and, under appropriate circumstances, moved back from the buffer station 2 to the pairing zone for pairing, so that the bare cells 9 in the pairing zone meet the pairing requirement for the bare cells 9, achieving pairing of the bare cells 9. This enables full utilization of the qualified bare cells 9 in the pairing zone for pairing, improving the utilization rate of the qualified bare cells 9 in the pairing zone.

It can be understood that the loading zone 132 having two carrying sections 131 capable of carrying bare cells 9 and the pairing zone having two carrying sections 131 capable of carrying bare cells 9 ensure that a quantity of carrying sections 131 capable of being loaded in the loading zone 132 is consistent with a quantity of carrying sections 131 capable of being paired in the pairing zone. This system can effectively accommodate pairing of two bare cells and pairing of four bare cells based on a limited number of pairing scenarios, reducing unpredictability in the arrangement of bare cells in the pairing zone.

In an embodiment, referring to FIG. 1 to FIG. 8 and FIG. 16 to FIG. 19, one of the conveying apparatuses is a first conveying apparatus 11, and another of the conveying apparatuses is a second conveying apparatus 12. The loading bare cells 9 onto the loading zone of each of the two conveying apparatuses arranged side by side, at least carrying sections 131 being provided in the loading zone of each conveying apparatus, further includes:

step S3: spaced every two carrying sections of the first conveying apparatus, load, by a corresponding loading mechanism, two bare cells from a loading table located at an end of the conveying apparatus facing away from a conveying direction onto corresponding two adjacent carrying sections in the loading zone of the first conveying apparatus; and step S4: spaced every one carrying section of the second conveying apparatus, load one bare cell from the loading table located at the end of the conveying apparatus facing away from the conveying direction onto a target carrying section via a side of the corresponding loading mechanism facing away from the conveying direction.

It should be explained that two bare cells 9 on the loading table 7 are arranged in the conveying direction.

It should be explained that the target carrying section 131 is one of two adjacent carrying sections 131 in the loading zone 132 of the second conveying apparatus 12, with the carrying section 131 facing away from the corresponding conveying direction.

For example, referring to FIG. 1 to FIG. 13, the buffer station 2 is located on a side of the first conveying apparatus 11 facing away from the second conveying apparatus 12 along the preset direction.

For example, referring to FIG. 1 to FIG. 13, in two tabs of the bare cell 9 on the first conveying apparatus 11, a polarity of the tab close to the buffer station 2 is negative, and a polarity of the tab away from the buffer station 2 is positive. Among two tabs of the bare cell 9 on the second conveying apparatus 12, a polarity of the tab close to the buffer station 2 is positive, and a polarity of the tab away from the buffer station 2 is negative. The arrangement of tabs of the bare cell 9 on the first conveying apparatus 11 and the arrangement of tabs of the bare cell 9 on the second conveying apparatus 12 are different.

It should be noted that when paired bare cells 9 placed in a housing of a battery cell are two bare cells 9, one bare cell 9 on the first conveying apparatus 11 and one bare cell 9 on the second conveying apparatus 12 are paired into a pair of two bare cells 9.

When the corresponding loading mechanism 5 loads two bare cells 9 onto two adjacent carrying sections 131 in the loading zone 132 of the first conveying apparatus 11, the first conveying apparatus 11 drives the corresponding carrying sections 131 to move a distance corresponding to two carrying sections 131 along the conveying direction, so that the two carrying sections 131 of the corresponding loading zone 132 move out and two carrying sections 131 upstream of the corresponding loading zone 132 move into the loading zone 132. The two vacant carrying sections 131 moved into the corresponding loading zone 132 are not loaded with bare cells 9. The first conveying apparatus 11 continues to drive the corresponding carrying sections 131 to move a distance corresponding to two carrying sections 131 along the conveying direction, so that the two carrying sections 131 of the corresponding loading zone 132 move out and two carrying sections 131 upstream of the corresponding loading zone 132 move into the loading zone 132. Then, the corresponding loading mechanism 5 loads two bare cells 9 from the loading table 7 onto two adjacent carrying sections 131 in the loading zone 132 of the first conveying apparatus 11. Two bare cells 9 picked up by the loading mechanism 5 correspond one-to-one with two carrying sections 131 in the loading zone 132 of the first conveying apparatus 11. A bare cell picked up by a side of the loading mechanism 5 facing away from the conveying direction is placed onto a carrying section on a side of the two carrying sections 131 in the loading zone 132 of the first conveying apparatus 11 facing away from the conveying direction, and a bare cell picked up by a side of the loading mechanism 5 facing the conveying direction is placed onto a carrying section on a side of the two carrying sections 131 in the loading zone 132 of the first conveying apparatus 11 facing the conveying direction.

When the corresponding loading mechanism 5 loads one of two bare cells 9 on the loading table 7 onto the target carrying section 131, the second conveying apparatus 12 drives the corresponding carrying sections 131 to move a distance corresponding to two carrying sections 131 along the conveying direction, so that two carrying sections 131 of the corresponding loading zone 132 move out and two carrying sections 131 upstream of the corresponding loading zone 132 move into the loading zone 132. After loading one bare cell 9 from the two bare cells 9 on the loading table 7, the remaining bare cell 9 on the loading table 7 is also one of the two bare cells 9 on the loading table 7, and the remaining one bare cell 9 on the loading table 7 is loaded onto the target carrying section 131. Two bare cells 9 on the loading table 7 are arranged in the corresponding conveying direction. The loading mechanism 5 picks up one bare cell 9 from the loading table 7 via a side facing away from the conveying direction and moves the bare cell 9 to the target carrying section 131 of the second conveying apparatus 12.

For example, referring to FIG. 1 to FIG. 14, a space required for loading by the loading mechanism 5 is generally located on a side of the corresponding loading zone 132 facing away from the conveying direction, reducing a possibility of interference by the loading mechanism 5 with an image capture device 6 located on a side of the loading zone 132 facing the conveying direction. A space required for loading by the loading mechanism 5 is generally located on a side of the corresponding loading table 7 facing the conveying direction, reducing interference by the loading mechanism 5 with an adjustment apparatus 8 located on a side of the loading table 7 facing away from the conveying direction. Accordingly, while minimizing interference by the loading mechanism 5 as much as possible, the image capture device 6 can be as close as possible to the loading zone 132, and the adjustment apparatus 8 can be as close as possible to the loading table 7, facilitating reduction of space occupied by the entire system in the conveying direction of the conveying apparatuses.

For example, the loading mechanism 5 can pick up two bare cells 9 arranged in the conveying direction on the loading table 7 and move the two bare cells 9 together to two carrying sections 131 in the loading zone 132 of the first conveying apparatus 11.

For example, the loading mechanism 5 can first pick up one bare cell 9 from two bare cells 9 arranged in the conveying direction on the loading table 7 and move the bare cell 9 to one carrying section 131 in the loading zone 132 of the first conveying apparatus 11, and then pick up the remaining one bare cell 9 on the loading table 7 by the loading mechanism 5 and move the remaining bare cell 9 to another carrying section 131 in the loading zone 132 of the first conveying apparatus 11.

In this embodiment of this disclosure, the loading mechanism 5 picks up two bare cells 9 from the loading table 7 and loads the two bare cells 9 onto two adjacent carrying sections 131 in the loading zone 132 of the first conveying apparatus 11. The loading mechanism 5 picks up the two bare cells 9 at positions corresponding to the two bare cells 9 on the loading table 7, and the loading mechanism 5 releases the two bare cells 9 at positions corresponding to the two adjacent carrying sections 131 in the loading zone 132 of the first conveying apparatus 11. The loading mechanism 5 picks up one of two bare cells 9 on the loading table 7 and loads the bare cell onto the target carrying section 131 of the second conveying apparatus 12. Since the target carrying section 131 is one of two adjacent carrying sections 131 in the loading zone 132 of the second conveying apparatus 12, with the carrying section 131 facing away from the corresponding conveying direction, the loading mechanism 5 picks up one bare cell 9 at a position corresponding to the two bare cells 9 on the loading table 7, and the loading mechanism 5 releases one bare cell 9 at a position corresponding to the two adjacent carrying sections 131 in the loading zone 132 of the second conveying apparatus 12. Therefore, a space required for the loading mechanism 5 to move from the loading table 7 to load onto the loading zone 132 of the corresponding conveying apparatus is generally within a region defined by the loading table 7, a side of the loading table 7 facing the corresponding conveying direction, a side of the corresponding loading zone 132 facing away from the corresponding conveying direction, and the corresponding loading zone 132. During a process of loading by the loading mechanism 5 onto the corresponding conveying apparatus, a possibility of interference between the loading mechanism 5 and a structure on a side of the loading zone 132 of the corresponding conveying apparatus facing the corresponding conveying direction is reduced, and a possibility of interference between the loading mechanism 5 and a structure on a side of the loading table 7 facing away from the corresponding conveying direction is reduced. Furthermore, since the space required for the loading mechanism 5 to move from the loading table 7 to load onto the loading zone 132 of the corresponding conveying apparatus is generally within the region defined by the loading table 7, the side of the loading table 7 facing the corresponding conveying direction, the side of the corresponding loading zone 132 facing away from the corresponding conveying direction, and the corresponding loading zone 132, under a condition of minimizing interference as much as possible, a structure on the side of the loading zone 132 of the corresponding conveying apparatus facing the corresponding conveying direction can be as close as possible to the corresponding loading zone 132, and a structure on the side of the loading table 7 facing away from the corresponding conveying direction relative to the loading mechanism 5 can be as close as possible to the loading table 7, facilitating reduction of space occupied by the entire system in the conveying direction of the conveying apparatuses. The first conveying apparatus 11 loads two bare cells 9 every two carrying sections 131, and the second conveying apparatus 12 loads one bare cell 9 every one carrying section 131, so that one bare cell 9 on the first conveying apparatus 11 can be paired with one bare cell 9 on the second conveying apparatus 12, better pairing into a pair of two bare cells 9, and in addition, two vacant carrying sections 131 spaced apart on the first conveying apparatus 11 can carry an excess one of two qualified bare cells 9 in the pairing zone of the first conveying apparatus 11 for pairing with a bare cell 9 on the second conveying apparatus 12, enabling full utilization of the qualified bare cells 9 paired by the first conveying apparatus 11.

It can be understood that a specific loading method is not limited. For example, both the first conveying apparatus 11 and the second conveying apparatus 12 may load one bare cell 9 every one carrying section 131. For example, both the first conveying apparatus 11 and the second conveying apparatus 12 may load two bare cells 9 every two carrying sections 131.

It can be understood that a structure downstream of and adjacent to the loading zone 132 is not necessarily the image capture device 6 and may be a structure other than the image capture device 6. A structure upstream of and adjacent to the loading table 7 is not necessarily the adjustment apparatus 8 and may be a structure other than the adjustment apparatus 8.

In an embodiment, referring to FIG. 1 and FIG. 17 to FIG. 19, the conveying the bare cells 9 carried by the corresponding carrying sections 131 to corresponding pairing zones by the two conveying apparatuses arranged side by side includes:

step S11: move two adjacent bare cells to a first pairing zone by the first conveying apparatus, the first pairing zone being the pairing zone corresponding to the first conveying apparatus; and step S12: move one bare cell to a second pairing zone by the second conveying apparatus, where a carrying section with the bare cell in the second pairing zone is located on a side of another carrying section facing away from the corresponding conveying direction, and the second pairing zone is a pairing zone corresponding to the second conveying apparatus.

For example, referring to FIG. 1 to FIG. 13, two carrying sections 131 are correspondingly arranged in each of the first pairing zone 111 and the second pairing zone 121, and the carrying sections 131 of the first pairing zone 111 and the carrying sections 131 of the second pairing zone 121 are aligned one-to-one.

For example, the carrying sections 131 in the first pairing zone 111 and the carrying sections 131 in the second pairing zone 121 may be slightly offset.

For example, referring to FIG. 1, each of the two carrying sections 131 in the first pairing zone 111 of the first conveying apparatus 11 carries a bare cell 9, each of the two carrying sections 131 in the loading zone 132 of the first conveying apparatus 11 carries a bare cell 9, a carrying section 131 carrying a bare cell 9 in the second pairing zone 121 of the second conveying apparatus 12 is located on a side of another carrying section 131 facing away from the corresponding conveying direction, a target carrying section 131 in the loading zone 132 of the second conveying apparatus 12 carries a bare cell 9, and the target carrying section 131 is located on a side of another carrying section 131 in the loading zone 132 facing away from the corresponding conveying direction. An overall arrangement of the bare cells 9 in the first pairing zone 111 and the bare cell 9 in the second pairing zone 121 is substantially consistent with an overall arrangement of the bare cells 9 in the loading zone 132 of the first conveying apparatus 11 and the bare cell 9 in the loading zone 132 of the second conveying apparatus 12.

In this embodiment of this disclosure, arranging two bare cells 9 in the first pairing zone 111 and positioning the carrying section 131 with the bare cell 9 in the second pairing zone 121 on the side of another carrying section 131 facing away from the corresponding conveying direction ensure that the overall arrangement of the bare cells 9 in the first pairing zone 111 and the bare cell 9 in the second pairing zone 121 is substantially consistent with the overall arrangement of the bare cells 9 in the loading zone 132 of the first conveying apparatus 11 and the bare cell 9 in the loading zone 132 of the second conveying apparatus 12. Under a condition that the conveying apparatuses move a fixed distance each time, consistency in the arrangement of the bare cells 9 moved into the pairing zones is improved.

Figure 2:
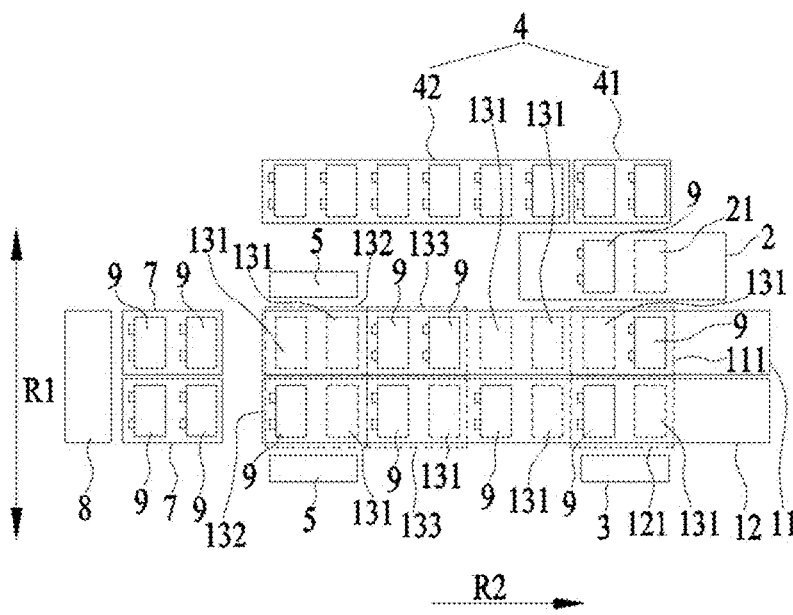
FIG. 2 is based on FIG. 1, showing a state where a first bare cell in the first pairing zone is moved along a preset direction to a buffer station, so that the bare cells in the pairing zones are paired into a pair of two bare cells.
Figure 3:
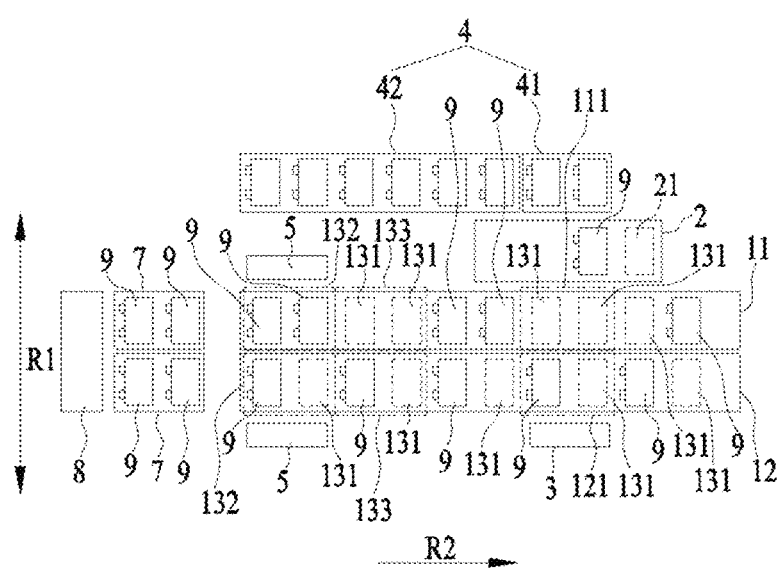
FIG. 3 is based on FIG. 2, showing a state where two carrying sections in a pairing zone are moved to a downstream side of the corresponding pairing zone, so that the paired two bare cells in the pairing zone are moved out of the pairing zone, two vacant carrying sections upstream of a first pairing zone are moved into the first pairing zone, and a buffer station drives a first bare cell to a position offset from a bare cell in a second pairing zone.
Figure 4:
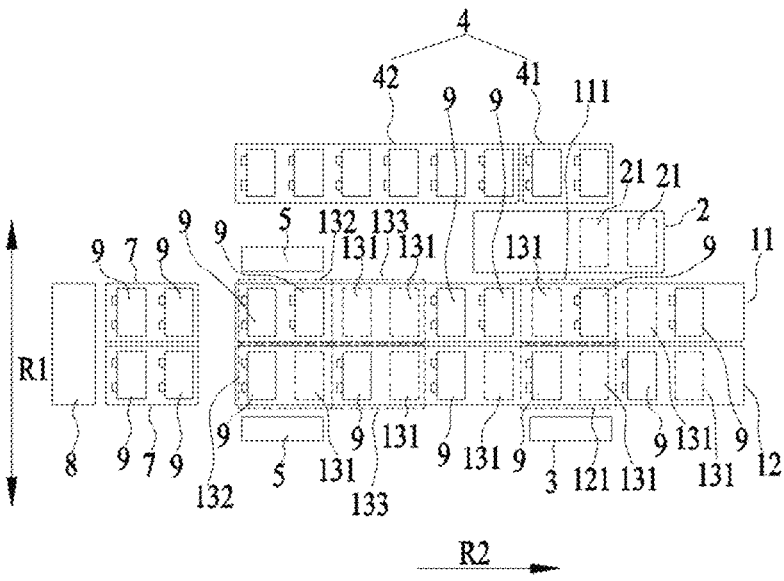
FIG. 4 is based on FIG. 3, showing a state where the first bare cell on the buffer station offset from the bare cell in the second pairing zone is moved to a corresponding carrying section in the first pairing zone, so that the bare cells in the pairing zone are paired into a pair of two bare cells.
Figure 5:
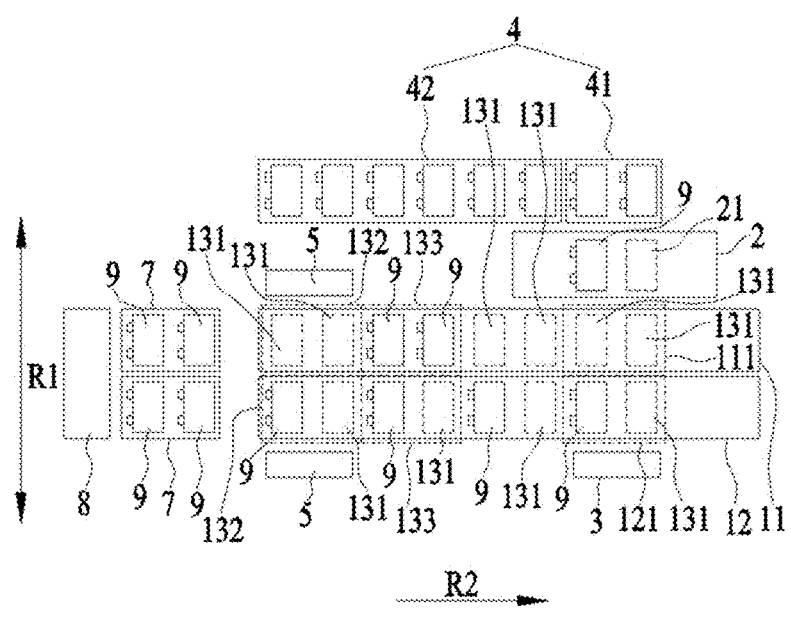
FIG. 5 is based on FIG. 1, showing a state where the first bare cell in the first pairing zone is moved to the buffer station for buffering, and a defective bare cell in the first pairing zone is moved to a storage station.
Figure 6:
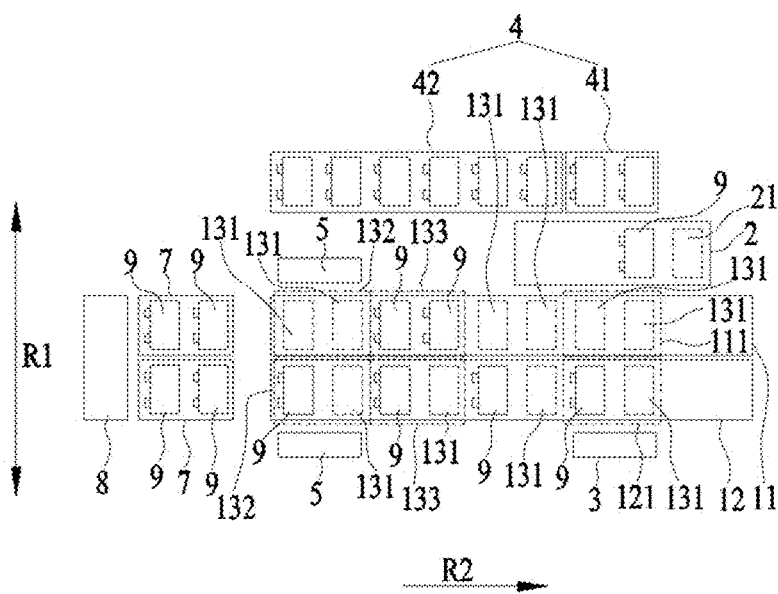
FIG. 6 is based on FIG. 5, showing a state where the buffer station drives the first bare cell to a position offset from a qualified bare cell in the second pairing zone, to align with a carrying section corresponding to the defective bare cell in the first pairing zone.
Figure 7:
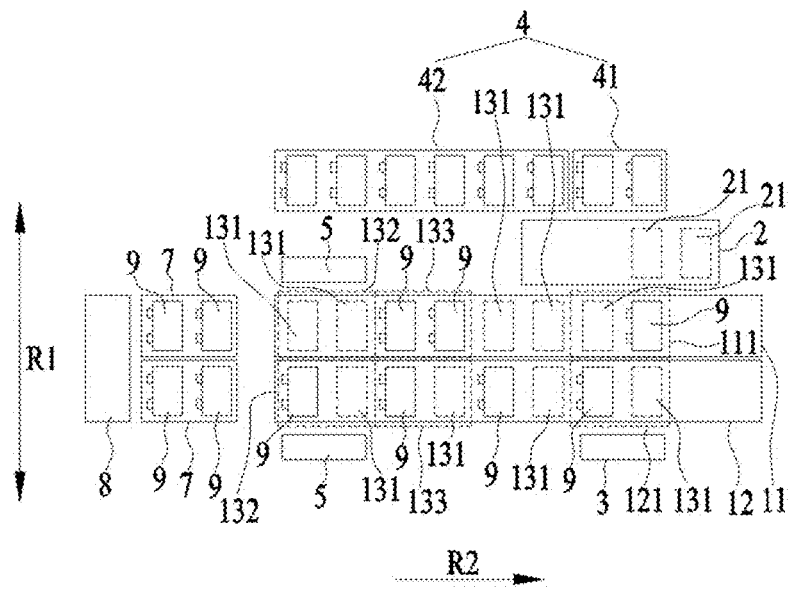
FIG. 7 is based on FIG. 6, showing a state where the first bare cell on the buffer station, aligned with the carrying section corresponding to the defective bare cell in the first pairing zone, is moved to the carrying section corresponding to the defective bare cell in the first pairing zone, to replace the defective bare cell in the first pairing zone with the qualified bare cell on the buffer station.

In an embodiment, referring to FIG. 1, FIG. 2, and FIG. 17, the pairing step includes:

step S21: determine that the arrangement of qualified bare cells does not meet the pairing requirement for the bare cells when two qualified bare cells are provided in the first pairing zone and one of the qualified bare cells is a first bare cell; and step S22: move, by the picking apparatus, the first bare cell along the preset direction to the buffer station, enabling the bare cells in the pairing zone to meet the pairing requirement for the bare cells.

It should be noted that for a scenario of pairing two bare cells 9, the pairing requirement for the bare cells 9 varies according to actual needs.

For example, for a scenario of pairing two bare cells 9, the pairing requirement for the bare cells 9 includes, in addition to the number of qualified bare cells 9 in the pairing zone of one conveying apparatus being one and the number of qualified bare cells 9 in the pairing zone of another conveying apparatus being one, a qualified bare cell 9 in the first pairing zone 111 being located on a side of a qualified bare cell 9 in the second pairing zone 121 facing the conveying direction.

It should be explained that the first bare cell 9 is aligned with a qualified bare cell 9 in the second pairing zone 121.

It should be explained that the pairing step refers to picking up, by the picking apparatus 3, a corresponding qualified bare cell 9 and moving the qualified bare cell 9 along the preset direction between the buffer station 2 and the carrying sections 131 in the pairing zone of the conveying apparatus when the arrangement of qualified bare cells 9 does not meet the pairing requirement for the bare cells 9, so that the bare cells 9 in the pairing zone meet the pairing requirement for the bare cells 9.

For example, when a bare cell 9 in the second pairing zone 121 is qualified, the qualified bare cell 9 in the second pairing zone 121 and a remaining qualified bare cell 9 in the first pairing zone 111 after moving out the first bare cell 9 meet the pairing requirement for the bare cells 9, thereby pairing into a pair of two bare cells 9.

For example, when the bare cell 9 in the second pairing zone 121 is defective, the defective bare cell 9 is moved out of the second pairing zone 121, and a bare cell 9 upstream of the second pairing zone 121 is moved into the second pairing zone 121 until a qualified bare cell 9 in the second pairing zone 121 and the remaining qualified bare cell 9 in the first pairing zone 111 after moving out the first bare cell 9 meet the pairing requirement for the bare cells 9.

For example, the picking apparatus 3 picks up a defective bare cell 9 in the second pairing zone 121 and moves the defective bare cell 9 along the preset direction to a storage station 4.

In this embodiment of this disclosure, since both bare cells 9 in the first pairing zone 111 are qualified, moving the aligned first bare cell 9 to the buffer station 2 for buffering allows pairing of the qualified bare cell 9 in the second pairing zone 121 with the remaining qualified bare cell 9 in the first pairing zone 111 into a pair of two bare cells 9, as long as the bare cell 9 in the second pairing zone 121 is qualified, achieving pairing of two bare cells 9.

In an embodiment, referring to FIG. 2 to FIG. 4 and FIG. 17, the pairing step further includes:

step S5: move, by the two conveying apparatuses, two carrying sections in the pairing zone corresponding to each conveying apparatus to a downstream side of the corresponding pairing zone when the bare cells in the pairing zone meet the pairing requirement for the bare cells, so that both carrying sections in the first pairing zone are vacant and one of two carrying sections in the second pairing zone carries a bare cell;

step S6: move the buffer station in a straight line parallel to the conveying direction of the conveying apparatuses to bring the first bare cell on the buffer station to a position offset from the bare cell in the second pairing zone;

step S7: move, by the picking apparatus, the first bare cell offset from the bare cell in the second pairing zone along the preset direction from the buffer station to a vacant carrying section in the first pairing zone; and step S8: determine that the bare cells in the pairing zone meet the pairing requirement for the bare cells when the bare cell in the second pairing zone is offset from the first bare cell moved from the buffer station to the first pairing zone and the bare cell in the second pairing zone is qualified.

It should be noted that a plurality of carrying sections 131 of the conveying apparatuses move together. Under action of the conveying apparatuses, when one carrying section 131 moves, other carrying sections 131 follow and move together.

It should be noted that moving two carrying sections 131 in the pairing zone corresponding to each conveying apparatus to the downstream side of the corresponding pairing zone by the two conveying apparatuses causes bare cells 9 in the pairing zone that meet the pairing requirement to move out to the downstream side of the corresponding pairing zone.

For example, each conveying apparatus is a belt-driven structure, a conveyor belt of the conveying apparatus is provided with a plurality of trays, the carrying sections 131 are formed on the trays, and the conveyor belt drives the plurality of trays to move together, thereby causing the carrying sections 131 of the conveying apparatus to move together.

For example, each conveying apparatus is a chain-driven structure, a conveyor chain of the conveying apparatus is provided with a plurality of trays, the carrying sections 131 are formed on the trays, and the conveyor chain drives the plurality of trays to move together, thereby causing the carrying sections 131 of the conveying apparatus to move together.

It can be understood that an order of performing step S5 and step S6 is not limited. Step S5 may be performed before step S6, step S6 may be performed before step S5, or step S5 and step S6 may be performed simultaneously.

For example, moving two carrying sections 131 in the pairing zone corresponding to each conveying apparatus to the downstream side of the corresponding pairing zone by the two conveying apparatuses causes both carrying sections 131 in the first pairing zone 111 to be vacant and one of two carrying sections 131 in the second pairing zone 121 to carry a bare cell 9. When a bare cell 9 moved into the second pairing zone 121 is defective, the defective bare cell 9 is moved out of the second pairing zone 121, and two carrying sections 131 upstream of the second pairing zone 121 are moved into the second pairing zone 121 by the second conveying apparatus 12 until the bare cell 9 in the second pairing zone 121 is a qualified bare cell 9.

For example, the picking apparatus 3 picks up a defective bare cell 9 in the second pairing zone 121 and moves the defective bare cell 9 along the preset direction to the storage station 4.

In this embodiment of this disclosure, after the picking apparatus 3 moves the first bare cell 9 to the buffer station 2 so that the bare cells 9 in the pairing zone meet the pairing requirement for the bare cells 9, the two conveying apparatuses move the bare cells meeting the pairing requirement 9 in the two pairing zones out of the pairing zones to facilitate a next pairing. The plurality of carrying sections of the conveying apparatuses move together. Therefore, when two carrying sections 131 in the first pairing zone 111 move out to the downstream side of the first pairing zone 111 so that the bare cell 9 in the first pairing zone 111 meeting the pairing requirement moves out of the pairing zone, two vacant carrying sections 131 originally upstream of the first pairing zone 111 correspondingly move into the first pairing zone 111; and when two carrying sections 131 in the second pairing zone 121 move out to the downstream side of the second pairing zone 121 so that the bare cell 9 in the second pairing zone 121 meeting the pairing requirement moves out of the pairing zone, two carrying sections 131 originally upstream of the second pairing zone 121 correspondingly move into the second pairing zone 121, and of the two carrying sections 131 moved into the second pairing zone 121, a carrying section 131 facing away from the conveying direction carries a bare cell 9. The movement of the buffer station 2 causes the first bare cells 9 on the buffer station 2 to be offset from the bare cells 9 in the second pairing zone 121, and then the picking apparatus 3 moves the offset first bare cell 9 on the buffer station 2 back to a corresponding carrying section 131 in the first pairing zone 111, ensuring that the arrangement of the bare cell 9 in the first pairing zone 111 and the bare cell 9 in the second pairing zone 121 meets the pairing requirement for the bare cells 9, and one bare cell 9 in the first pairing zone 111 is paired with one bare cell 9 in the second pairing zone 121 to form a pair of two bare cells 9. Qualified bare cells 9 on the buffer station 2 fully utilize the two vacant carrying sections 131 for pairing, thus improving pairing efficiency.

It can be understood that after successfully pairing a pair of two bare cells 9 based on step S8, the first conveying apparatus 11 moves two carrying sections 131 of the first pairing zone 111 to the downstream side of the first pairing zone 111, which causes two carrying sections 131 upstream of the first pairing zone 111 carrying bare cells 9 to move into the first pairing zone 111 correspondingly. The second conveying apparatus 12 moves two carrying sections 131 of the second pairing zone 121 to the downstream side of the second pairing zone 121, which causes two carrying sections 131 upstream of the second pairing zone 121 to move into the second pairing zone 121 correspondingly, and of the two carrying sections 131 of the second pairing zone 121, a carrying section 131 with a bare cell 9 is located on a side of another carrying section 131 facing away from the conveying direction.

In an embodiment, referring to FIG. 1, FIG. 5 to FIG. 7, and FIG. 18, defective bare cells 9 are stored at a storage station 4. The pairing step includes the following steps.

Step S23: determine that the arrangement of a qualified bare cell does not meet the pairing requirement for the bare cells when one qualified bare cell and one defective bare cell exist in the first pairing zone and the qualified bare cell is a first bare cell.

It should be explained that the first bare cell 9 is aligned with a qualified bare cell 9 in the second pairing zone 121.

Step S24: move, by the picking apparatus, the defective bare cell along the preset direction to the storage station.

Step S25: move, by the picking apparatus, the first bare cell along the preset direction to the buffer station.

Step S26: move the buffer station in a straight line parallel to the conveying direction of the conveying apparatuses to bring the first bare cell on the buffer station to a position offset from the qualified bare cell in the second pairing zone.

Step S27: move, by the picking apparatus, the first bare cell offset from the qualified bare cell in the second pairing zone along the preset direction from the buffer station to a carrying section in the first pairing zone, enabling the bare cells in the pairing zone to meet the pairing requirement for the bare cells.

Bare cells 9 to be paired need to be qualified bare cells 9. When a defective bare cell 9 exists in the pairing zone, the defective bare cell 9 is not needed, and the defective bare cell 9 is moved by the picking apparatus 3 to the storage station 4 for placement. Defective bare cells 9 on the storage station 4 can be collectively processed.

For example, when a bare cell 9 in the second pairing zone 121 is defective, the defective bare cell 9 is moved out of the second pairing zone 121, and a bare cell 9 upstream of the second pairing zone 121 is moved into the second pairing zone 121 until a qualified bare cell 9 in the second pairing zone 121 and a remaining qualified bare cell 9 in the first pairing zone 111 after moving out the first bare cell 9 meet the pairing requirement for the bare cells 9.

For example, a defective bare cell 9 in the first pairing zone 111 and a defective bare cell 9 in the second pairing zone 121 are respectively moved along the preset direction to the storage station 4 by the picking apparatus 3.

In this embodiment of this disclosure, a defective bare cell 9 is moved to the storage station 4 by the picking apparatus 3 to remove the defective bare cell 9 from the pairing zone. The first bare cell 9 in the first pairing zone 111 is aligned with a bare cell 9 in the second pairing zone 121 but they do not meet the pairing requirement for the bare cells 9, making pairing into a pair of two bare cells 9 difficult, and a change in a position of the first bare cell 9 in the pairing zone is required. The picking apparatus 3 moves along the preset direction, moving the first bare cell 9 aligned with the bare cell 9 in the second pairing zone 121 to the buffer station 2. Then the buffer station 2 moves in a straight line parallel to the conveying direction of the conveying apparatuses, offsetting the first bare cell 9 on the buffer station 2 from the bare cell 9 in the second pairing zone 121. Then the picking apparatus 3 moves the offset first bare cell 9 back to a corresponding carrying section 131 in the first pairing zone 111 along the preset direction, ensuring that the first bare cell 9 moved back from the buffer station 2 to the first pairing zone 111 is offset from the bare cell 9 in the second pairing zone 121. In this case, as long as the corresponding offset bare cell 9 in the second pairing zone 121 is qualified, and the bare cells 9 in the pairing zone meet the pairing requirement for the bare cells 9, one bare cell 9 in the first pairing zone 111 and one bare cell 9 in the second pairing zone 121 are successfully paired into a pair of two bare cells 9.

Figure 8:
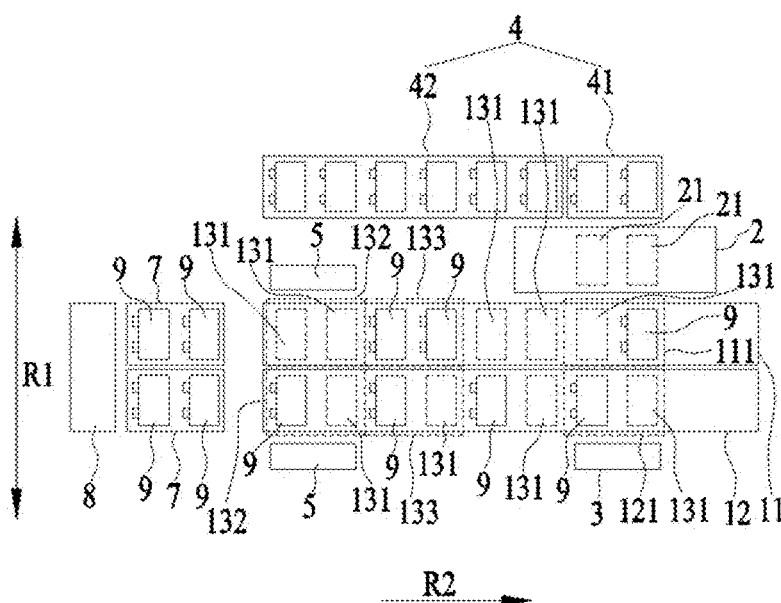
FIG. 8 is based on FIG. 1, showing a state where a defective bare cell in the first pairing zone, aligned with a bare cell in the second pairing zone, is moved to the storage station, so that a qualified bare cell in the first pairing zone and a qualified bare cell in the second pairing zone are paired into a pair of two bare cells, with the qualified bare cell in the first pairing zone being offset from the qualified bare cell in the second pairing zone.

In an embodiment, referring to FIG. 1, FIG. 8, and FIG. 19, defective bare cells 9 are stored at a storage station 4. The method further includes the following steps.

Step S9: move, by the picking apparatus, the defective bare cell in the first pairing zone along the preset direction to the storage station when a qualified bare cell in the first pairing zone is offset from a qualified bare cell in the second pairing zone and a defective bare cell exists in the first pairing zone, enabling the bare cells in the pairing zone to meet the pairing requirement for the bare cells.

For example, when a bare cell 9 in the second pairing zone 121 is defective, the defective bare cell 9 is moved out of the second pairing zone 121, and a bare cell 9 upstream of the second pairing zone 121 is moved into the second pairing zone 121 until a qualified bare cell 9 in the second pairing zone 121 and a remaining qualified bare cell 9 in the first pairing zone 111 after moving out the first bare cell 9 meet the pairing requirement for the bare cells 9.

In this embodiment of this disclosure, when a qualified bare cell 9 in the first pairing zone 111 is offset from a qualified bare cell 9 in the second pairing zone 121, as long as no defective bare cell 9 exists in the first pairing zone 111 and the second pairing zone 121, the bare cells 9 in the pairing zone can meet the pairing requirement for the bare cells 9. Therefore, moving a defective bare cell 9 in the first pairing zone 111 along the preset direction to the storage station 4 by the picking apparatus 3 ensures that a remaining qualified bare cell 9 in the first pairing zone 111 and a qualified bare cell 9 in the second pairing zone 121 meet the pairing requirement for the bare cells 9, allowing the remaining qualified bare cell 9 in the first pairing zone 111 and the qualified bare cell 9 in the second pairing zone 121 to be paired into a pair of two bare cells 9.

It can be understood that when both bare cells 9 in the first pairing zone 111 are defective, two defective bare cells 9 in the first pairing zone 111 are picked up and moved along the preset direction to the storage station 4 by the picking apparatus 3. Two carrying sections 131 in the first pairing zone 111 after moving out the two defective bare cells 9 are moved to the downstream side of the first pairing zone 111 by the first conveying apparatus 11, so that two carrying sections 131 upstream of the first pairing zone 111 carrying bare cells 9 are moved into the first pairing zone 111.

For example, the picking apparatus 3 can pick up two defective bare cells 9 in the first pairing zone 111 together and move the two defective bare cells 9 along the preset direction to the storage station 4.

For example, the picking apparatus 3 can pick up one of two defective bare cells 9 in the first pairing zone 111 and move the defective bare cell 9 along the preset direction to the storage station 4, and then the picking apparatus 3 picks up another of the two defective bare cells 9 in the first pairing zone 111 and moves the defective bare cell 9 along the preset direction to the storage station 4.

In an embodiment, referring to FIG. 9 to FIG. 13 and FIG. 20 to FIG. 22, the loading bare cells onto the loading zone of each of the two conveying apparatuses arranged side by side, at least two carrying sections being provided in the loading zone of each conveying apparatus, further includes:

Step S10: load, by a loading mechanism, two bare cells from a loading table located at an end of the conveying apparatus facing away from the conveying direction onto corresponding two adjacent carrying sections in the loading zone of the corresponding conveying apparatus, so that all carrying sections upstream of the pairing zone of each conveying apparatus carry bare cells, the two bare cells on the loading table being arranged in the conveying direction.

It should be noted that paired bare cells 9 placed in a housing of a battery cell may be a pair of four bare cells 9, requiring two bare cells 9 in the pairing zone of each conveying apparatus to be qualified to pair into a pair of four bare cells 9.

Two bare cells 9 on the loading table 7 located at the end of the conveying apparatus facing away from the conveying direction are loaded by the loading mechanism 5 onto corresponding two adjacent carrying sections 131 in the loading zone 132 of the corresponding conveying apparatus. Of the two bare cells 9 on the loading table 7, a bare cell 9 facing away from the conveying direction is loaded onto a carrying section 131 facing away from the conveying direction in two carrying sections 131 in the loading zone 132. Of the two bare cells 9 on the loading table 7, a bare cell 9 facing the conveying direction is loaded onto a carrying section 131 facing the conveying direction in two carrying sections 131 in the loading zone 132. Two bare cells 9 on the loading table 7 correspond one-to-one with two carrying sections 131 in the loading zone 132.

For example, the loading mechanism 5 can pick up two bare cells 9 arranged in the conveying direction on the loading table 7 and move the two bare cells 9 together to two carrying sections 131 in the loading zone 132 of the corresponding conveying apparatus.

For example, the loading mechanism 5 can first pick up one bare cell 9 from two bare cells 9 arranged in the conveying direction on the loading table 7 and move the bare cell 9 to one carrying section 131 in the loading zone 132 of the corresponding conveying apparatus, and then pick up a remaining one bare cell 9 on the loading table 7 by the loading mechanism 5 and move the remaining bare cell 9 to another carrying section 131 in the loading zone 132 of the corresponding conveying apparatus.

For example, referring to FIG. 9 to FIG. 13, all carrying sections 131 upstream of the first pairing zone 111 of the first conveying apparatus 11 carried bare cells 9. All carrying sections 131 upstream of the second pairing zone 121 of the second conveying apparatus 12 carried bare cells 9.

In this embodiment of this disclosure, all carrying sections 131 upstream of the pairing zone of each conveying apparatus carry bare cells 9, with no spacing carrying section 131 between two adjacent bare cells 9, which can better accommodate pairing of four bare cells 9, thereby pairing into a pair of four bare cells 9. Since two bare cells 9 on the loading table 7 located at the end of the conveying apparatus facing away from the conveying direction are loaded by the loading mechanism 5 onto corresponding two adjacent carrying sections 131 in the loading zone 132 of the corresponding conveying apparatus, two bare cells 9 on the loading table 7 almost correspond one-to-one with two carrying sections 131 in the loading zone 132 of the conveying apparatus. A space required for the loading mechanism 5 to move from the loading table 7 to load onto the loading zone 132 of the corresponding conveying apparatus is generally within a region defined by the loading table 7, a side of the loading table 7 facing the corresponding conveying direction, a side of the corresponding loading zone 132 facing away from the corresponding conveying direction, and the corresponding loading zone 132. During a process of loading by the loading mechanism 5 onto the corresponding conveying apparatus, a possibility of interference between the loading mechanism 5 and a structure on a side of the loading zone 132 of the corresponding conveying apparatus facing the corresponding conveying direction is reduced, and a possibility of interference between the loading mechanism 5 and a structure on a side of the loading table 7 facing away from the corresponding conveying direction is reduced. Furthermore, since the space required for the loading mechanism 5 to move from the loading table 7 to load onto the loading zone 132 of the corresponding conveying apparatus is generally within the region defined by the loading table 7, the side of the loading table 7 facing the corresponding conveying direction, the side of the corresponding loading zone 132 facing away from the corresponding conveying direction, and the corresponding loading zone 132, under a condition of minimizing interference as much as possible, a structure on the side of the loading zone 132 of the corresponding conveying apparatus facing the corresponding conveying direction can be as close as possible to the corresponding loading zone 132, and a structure on the side of the loading table 7 facing away from the corresponding conveying direction relative to the loading mechanism 5 can be as close as possible to the loading table 7, facilitating reduction of space occupied by the entire system in the conveying direction of the conveying apparatuses.

In an embodiment, referring to FIG. 9, FIG. 11, FIG. 13, and FIG. 20, defective bare cells 9 are stored at a storage station 4. The pairing step includes:

step S281: determine that the arrangement of the qualified bare cell does not meet the pairing requirement for the bare cells when one qualified bare cell and one defective bare cell exist in the pairing zone of any conveying apparatus;

step S282: move, by the picking apparatus, the defective bare cell along the preset direction to the storage station; and step S283: move, by the picking apparatus, the bare cell at a corresponding buffer position along the preset direction to a vacant carrying section corresponding to the defective bare cell when the corresponding buffer position on the buffer station contains a qualified bare cell.

It should be noted that defective bare cells 9 in the pairing zone are all moved to the storage station 4 by the picking apparatus 3, and bare cells 9 stored on the buffer station 2 are qualified bare cells 9.

It should be noted that in a process of pairing four bare cells 9, the pairing zone of each conveying apparatus may have qualified bare cells 9 that need to be buffered. Therefore, each conveying apparatus corresponds to one buffer position 21 on the buffer station 2. When a qualified bare cell 9 in the pairing zone of the conveying apparatus needs buffering, the qualified bare cell 9 in the pairing zone of the conveying apparatus is moved to the corresponding buffer position 21 on the buffer station 2 by the picking apparatus 3 for buffering, facilitating better identification of the conveying apparatus corresponding to the bare cell 9 stored on the buffer station 2.

Figure 11:
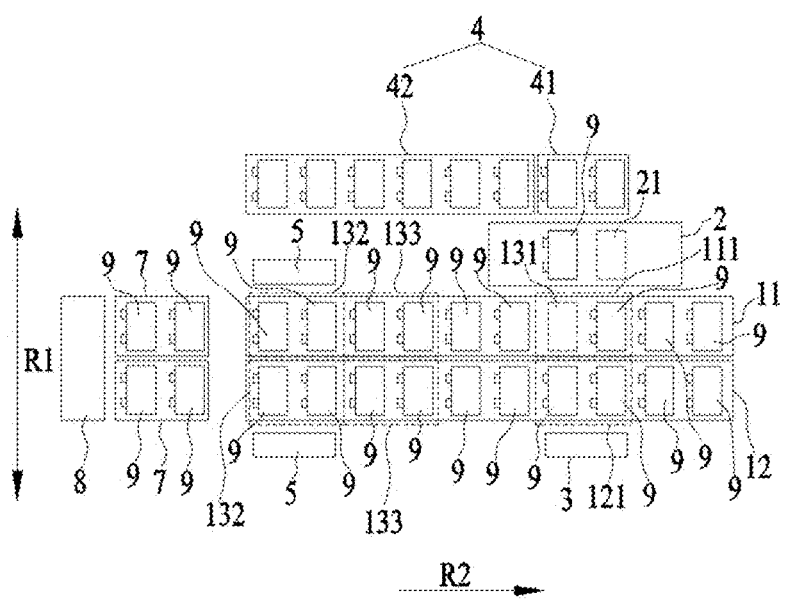
FIG. 11 is based on FIG. 9, showing a state where, when a corresponding buffer position on the buffer station contains a qualified bare cell, a defective bare cell in the first pairing zone on a side facing away from the conveying direction is moved to the storage station, and the bare cell corresponding to the buffer station is moved to the first pairing zone to replace the defective bare cell in the first pairing zone on the side facing away from the conveying direction.
Figure 13:
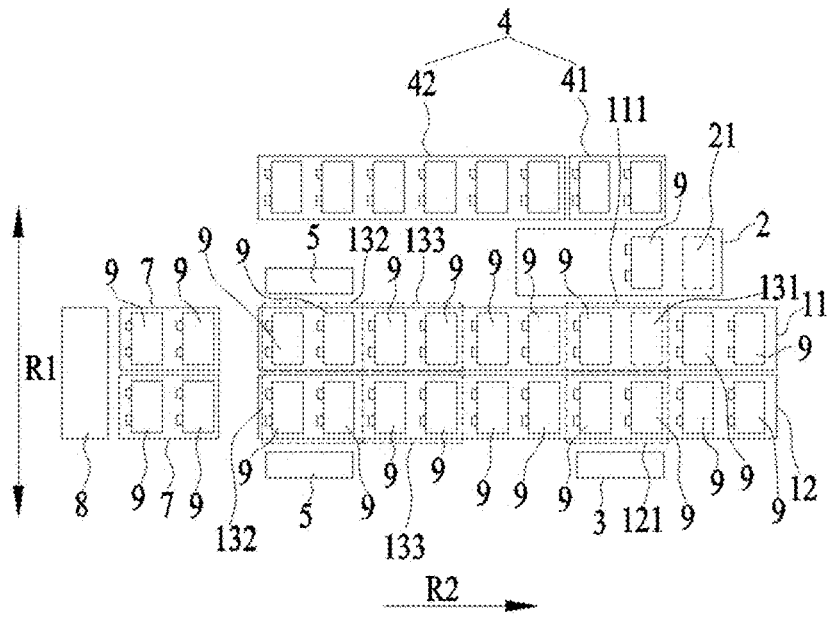
FIG. 13 is based on FIG. 9, showing a state where, when a corresponding buffer position on the buffer station contains a qualified bare cell, a defective bare cell in the first pairing zone on a side facing the conveying direction is moved to the storage station, and the bare cell at the corresponding buffer position on the buffer station is moved to the first pairing zone to replace the defective bare cell in the first pairing zone on the side facing the conveying direction.

For example, referring to FIG. 9, FIG. 11, and FIG. 13, when one qualified bare cell 9 and one defective bare cell 9 exist in the first pairing zone 111 of the first conveying apparatus 11, the defective bare cell 9 is moved to the storage station 4 by the picking apparatus 3. When a buffer position 21 corresponding to the first pairing zone 111 on the buffer station 2 contains a qualified bare cell 9, the qualified bare cell 9 at the corresponding buffer position 21 is moved by the picking apparatus 3 along the preset direction to a carrying section 131 corresponding to the defective bare cell 9 in the first pairing zone 111, thereby replacing the defective bare cell 9.

For example, when one qualified bare cell 9 and one defective bare cell 9 exist in the second pairing zone 121 of the second conveying apparatus 12, the defective bare cell 9 is moved to the storage station 4 by the picking apparatus 3. When a buffer position 21 corresponding to the second pairing zone 121 on the buffer station 2 contains a qualified bare cell 9, the qualified bare cell 9 at the corresponding buffer position 21 is moved by the picking apparatus 3 along the preset direction to a carrying section 131 corresponding to the defective bare cell 9 in the second pairing zone 121, thereby replacing the defective bare cell 9.

For example, referring to FIG. 1 to FIG. 13, the buffer station 2 has two buffer positions 21.

In this embodiment of this disclosure, moving a defective bare cell 9 in the pairing zone to the storage station 4 for storage along the preset direction by the picking apparatus 3 and replacing the defective bare cell 9 with a qualified bare cell 9 from the buffer station 2 at a position of the defective bare cell 9 in the pairing zone ensure that two bare cells 9 in the pairing zone of each of the two conveying apparatuses are qualified, meeting the pairing requirement for the bare cells 9. This allows two qualified bare cells 9 in the pairing zone of one conveying apparatus and two qualified bare cells 9 in the pairing zone of another conveying apparatus to be paired into a pair of four bare cells 9, achieving pairing of four bare cells 9.

In an embodiment, referring to FIG. 9, FIG. 10, FIG. 12, and FIG. 21, the pairing step further includes:

step S284: move, by the picking apparatus, a qualified bare cell in the corresponding pairing zone along the preset direction to a corresponding buffer position when the corresponding buffer position on the buffer station is vacant; and step S285: move, by the corresponding conveying apparatus, two vacant carrying sections to a downstream side of the pairing zone, so that two carrying sections upstream of the corresponding pairing zone move into the corresponding pairing zone.

Figure 10:
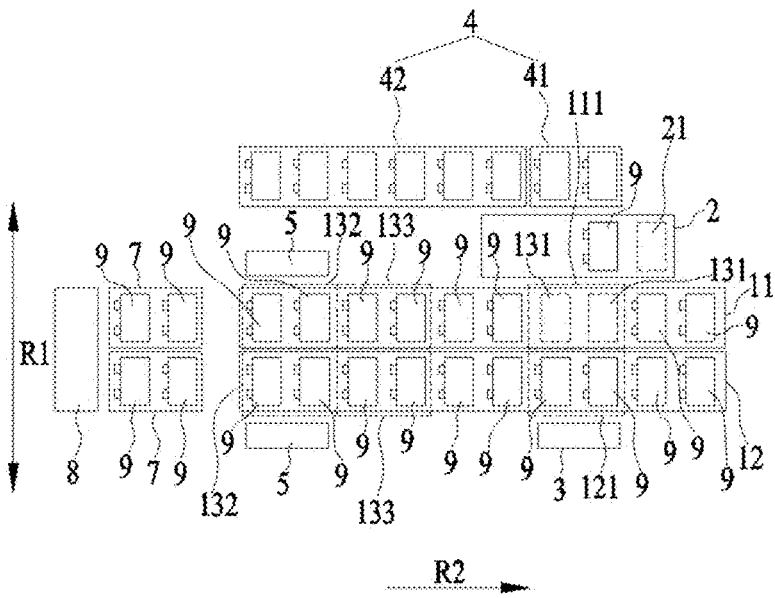
FIG. 10 is based on FIG. 9, showing a state where a defective bare cell in the first pairing zone facing away from a conveying direction is moved to a storage station, and a qualified bare cell in the first pairing zone facing the conveying direction is moved to a corresponding buffer position on a buffer station.
Figure 12:
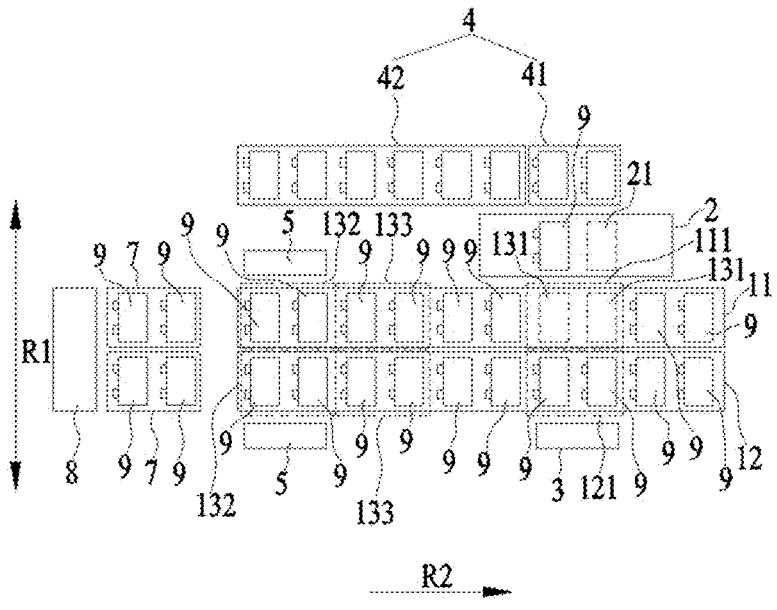
FIG. 12 is based on FIG. 9, showing a state where a defective bare cell in the first pairing zone facing the conveying direction is moved to the storage station, and a qualified bare cell in the first pairing zone facing away from the conveying direction is moved to a corresponding buffer position on the buffer station.

For example, referring to FIG. 9, FIG. 10, and FIG. 12, when a buffer position 21 corresponding to the first pairing zone 111 on the buffer station 2 is vacant, a qualified bare cell 9 in the first pairing zone 111 is moved along the preset direction to the corresponding buffer position 21 by the picking apparatus 3. The buffer station 2 can be moved in a straight line where the conveying direction lies to align the buffer position 21 with a bare cell 9 requiring buffering.

For example, when a buffer position 21 corresponding to the second pairing zone 121 on the buffer station 2 is vacant, a qualified bare cell 9 in the second pairing zone 121 is moved along the preset direction to the corresponding buffer position 21 by the picking apparatus 3. The buffer station 2 can be moved in a straight line where the conveying direction lies to align the buffer position 21 with a bare cell 9 requiring buffering.

In this embodiment of this disclosure, a defective bare cell 9 in the pairing zone is moved to the storage station 4 by the picking apparatus 3, and when no corresponding qualified bare cell 9 on the buffer station 2 is available for replacement, a remaining qualified bare cell 9 in the corresponding pairing zone could not meet the pairing requirement for the bare cells 9. Moving the remaining qualified bare cell 9 in the corresponding pairing zone to the corresponding buffer position 21 on the buffer station 2 by the picking apparatus 3 for buffering and moving upstream carrying sections 131 into the pairing zone allow the qualified bare cell 9 to be moved back from the buffer station 2 to the pairing zone for pairing under suitable conditions in a subsequent pairing process. This ensures full utilization of the qualified bare cell 9 for pairing, improving the utilization rate of the qualified bare cells 9.

In an embodiment, referring to FIG. 9, FIG. 13, and FIG. 20, the pairing step further includes:

> step S286: move the buffer station in a straight line parallel to the conveying direction of the conveying apparatuses to align a bare cell at a corresponding buffer position on the buffer station with a carrying section corresponding to a defective bare cell in the pairing zone.

In this embodiment of this disclosure, moving the buffer station 2 in a straight line parallel to the conveying direction of the conveying apparatuses aligns the corresponding buffer position 21 with the corresponding carrying section 131, facilitating movement of a qualified bare cell 9 at the corresponding buffer position 21 in the preset direction back to the carrying section 131 corresponding to the defective bare cell 9 in the pairing zone by the picking apparatus 3. This replaces the defective bare cell 9 in the corresponding pairing zone with the qualified bare cell 9 on the buffer station 2, ensuring that two bare cells 9 in the pairing zone of each conveying apparatus are qualified.

In an embodiment, referring to FIG. 22, defective bare cells 9 are stored at a storage station 4. The method further includes:

> step S20: move, by the picking apparatus, the defective bare cells along the preset direction to the storage station when both bare cells in any pairing zone are defective; and
>
> step S30: move, by the corresponding conveying apparatus, two vacant carrying sections to a downstream side of the pairing zone, so that two carrying sections upstream of the corresponding pairing zone move into the corresponding pairing zone.

For example, when both bare cells 9 in the first pairing zone 111 are defective, after moving two defective bare cells 9 in the first pairing zone 111 to the storage station 4, the first conveying apparatus 11 drives two carrying sections 131 in the first pairing zone 111 to move to the downstream side of the first pairing zone 111, causing two carrying sections 131 upstream of the first pairing zone 111 to move into the first pairing zone 111. When both bare cells 9 in the second pairing zone 121 are defective, after moving two defective bare cells 9 in the second pairing zone 121 to the storage station 4, the second conveying apparatus 12 drives two carrying sections 131 in the second pairing zone 121 to move to the downstream side of the second pairing zone 121, causing two carrying sections 131 upstream of the second pairing zone 121 to move into the second pairing zone 121.

In this embodiment of this disclosure, when both bare cells 9 in any pairing zone are defective, all defective bare cells 9 in the pairing zone are moved to the storage station 4 by the picking apparatus 3. After moving two defective bare cells 9 in the pairing zone to the storage station 4, both carrying sections 131 in the pairing zone became vacant, making pairing difficult. Moving the two vacant carrying sections 131 to the downstream side of the pairing zone by the corresponding conveying apparatus allows two carrying sections 131 upstream of the corresponding pairing zone to move into the corresponding pairing zone for further pairing.

In an embodiment, each conveying apparatus moves a distance corresponding to a preset quantity of carrying sections 131 each time, so that during each movement, each conveying apparatus moves the preset quantity of carrying sections 131 through the pairing zone to the downstream side of the pairing zone and moves two carrying sections 131 upstream of the pairing zone into the pairing zone. The preset number is even.

In an embodiment, referring to FIG. 1 to FIG. 13, each conveying apparatus moves a distance corresponding to two carrying sections 131 each time, so that during each movement, each conveying apparatus moves two carrying sections 131 to the downstream side of the pairing zone and moves two carrying sections 131 upstream of the pairing zone into the pairing zone.

In this embodiment of this disclosure, whether pairing two bare cells 9 or four bare cells 9, each pairing zone requires two carrying sections 131, and correspondingly, each loading zone 132 requires two carrying sections 131. Moving a distance corresponding to two carrying sections 131 each time by each conveying apparatus ensures that the arrangement of bare cells 9 carried by two carrying sections 131 moved into the pairing zone remains substantially unchanged, facilitating stable pairing of the bare cells 9.

The foregoing embodiments are for description of the technical solutions of this disclosure only rather than for limiting this disclosure. Although this disclosure has been described in detail with reference to the foregoing embodiments, persons of ordinary skill in the art should appreciate that modifications can still be made to the technical solutions described in the foregoing embodiments, or equivalent replacements can be made to some or all of the technical features. Such modifications or replacements do not cause the essence of the corresponding technical solutions to depart from the scope of the technical solutions of the embodiments of this disclosure. All such modifications and equivalent replacements shall fall within the scope of this disclosure. In particular, as long as there is no structural conflict, the various technical features mentioned in the embodiments can be combined in any manner.

The invention claimed is:

1. A method for pairing bare cells comprising:

loading bare cells onto a loading zone of each of two conveying apparatuses arranged side by side, at least two carrying sections being provided in the loading zone of each conveying apparatus;

conveying the bare cells carried by corresponding carrying sections to corresponding pairing zones by the two conveying apparatuses arranged side by side, wherein a conveying direction of the conveying apparatuses is arranged to intersect with a preset direction, the preset direction is a direction in which the two conveying apparatuses are arranged side by side, tabs of the bare cells on the two conveying apparatuses are different in arrangement, and two carrying sections are provided in the pairing zone of each conveying apparatus; and pairing: when the arrangement of qualified bare cells does not meet a pairing requirement for the bare cells, picking up, by a picking apparatus, a corresponding qualified bare cell and moving the qualified bare cell along the preset direction between a buffer station that is configured to store only qualified bare cells, and the carrying sections in a pairing zone of the conveying apparatus, enabling the bare cells in the pairing zone to meet the pairing requirement for the bare cells.

2. The method according to claim 1, wherein one conveying apparatus is a first conveying apparatus, and another conveying apparatus is a second conveying apparatus; and the loading bare cells onto the loading zone of each of the two conveying apparatuses arranged side by side, at least two carrying sections being provided in the loading zone of each conveying apparatus, further comprises:

spaced every two carrying sections of the first conveying apparatus, loading, by a corresponding loading mechanism, two bare cells from a loading table located at an end of the conveying apparatus facing away from the conveying direction onto corresponding two adjacent carrying sections in the loading zone of the first conveying apparatus, the two bare cells on the loading table being arranged in the conveying direction; and spaced every one carrying section of the second conveying apparatus, loading one bare cell from the loading table located at the end of the conveying apparatus facing away from the conveying direction onto a target carrying section via a side of the corresponding loading mechanism facing away from the conveying direction, the target carrying section being one of two adjacent carrying sections in the loading zone of the second conveying apparatus, with the carrying section facing away from the corresponding conveying direction.

3. The method according to claim 2, wherein the conveying the bare cells carried by corresponding carrying sections to corresponding pairing zones by the two conveying apparatuses arranged side by side comprises:

moving two adjacent bare cells to a first pairing zone by the first conveying apparatus, the first pairing zone being the pairing zone corresponding to the first conveying apparatus; and moving one bare cell to a second pairing zone by the second conveying apparatus, wherein a carrying section with the bare cell in the second pairing zone is located on a side of another carrying section facing away from the corresponding conveying direction, and the second pairing zone is a pairing zone corresponding to the second conveying apparatus.

4. The method according to claim 3, wherein the pairing comprises:

determining that the arrangement of qualified bare cells does not meet the pairing requirement for the bare cells when two qualified bare cells are provided in the first pairing zone and one of the qualified bare cells is a first bare cell, the first bare cell being aligned with a qualified bare cell in the second pairing zone; and moving, by the picking apparatus, the first bare cell along the preset direction to the buffer station, enabling the bare cells in the pairing zone to meet the pairing requirement for the bare cells.

5. The method according to claim 4, wherein the pairing further comprises:

moving, by the two conveying apparatuses, two carrying sections in the pairing zone corresponding to each conveying apparatus to a downstream side of the corresponding pairing zone when the bare cells in the pairing zone meet the pairing requirement for the bare cells, so that both carrying sections in the first pairing zone are vacant and one of two carrying sections in the second pairing zone carries a bare cell;

moving the buffer station in a straight line parallel to the conveying direction of the conveying apparatuses to bring the first bare cell on the buffer station to a position offset from the bare cell in the second pairing zone;

moving, by the picking apparatus, the first bare cell offset from the bare cell in the second pairing zone along the preset direction from the buffer station to a vacant carrying section in the first pairing zone; and determining that the bare cells in the pairing zone meet the pairing requirement for the bare cells when the bare cell in the second pairing zone is offset from the first bare cell moved from the buffer station to the first pairing zone and the bare cell in the second pairing zone is qualified.

6. The method according claim 3, wherein defective bare cells are stored at a storage station; and wherein the pairing comprises:

determining that the arrangement of the qualified bare cell does not meet the pairing requirement for the bare cells when one qualified bare cell and one defective bare cell exist in the first pairing zone and the qualified bare cell is a first bare cell, the first bare cell being aligned with a qualified bare cell in the second pairing zone;

moving, by the picking apparatus, the defective bare cell along the preset direction to the storage station;

moving, by the picking apparatus, the first bare cell along the preset direction to the buffer station;

moving the buffer station in a straight line parallel to the conveying direction of the conveying apparatuses to bring the first bare cell on the buffer station to a position offset from the qualified bare cell in the second pairing zone; and moving, by the picking apparatus, the first bare cell offset from the qualified bare cell in the second pairing zone along the preset direction from the buffer station to a carrying section in the first pairing zone, enabling the bare cells in the pairing zone to meet the pairing requirement for the bare cells.

7. The method according to claim 3, wherein defective bare cells are stored at a storage station; and wherein the method further comprises:

moving, by the picking apparatus, the defective bare cell in the first pairing zone along the preset direction to the storage station when a qualified bare cell in the first pairing zone is offset from a qualified bare cell in the second pairing zone and a defective bare cell exists in the first pairing zone, enabling the bare cells in the pairing zone to meet the pairing requirement for the bare cells.

8. The method according to claim 1, wherein the loading bare cells onto a loading zone of each of the two conveying apparatuses arranged side by side, at least two carrying sections being provided in the loading zone of each conveying apparatus, further comprises:

loading, by a loading mechanism, two bare cells from a loading table located at an end of the conveying apparatus facing away from the conveying direction onto corresponding two adjacent carrying sections in the loading zone of the corresponding conveying apparatus, so that all carrying sections upstream of the pairing zone of each conveying apparatus carry bare cells, the two bare cells on the loading table being arranged in the conveying direction.

9. The method according to claim 8, wherein defective bare cells are stored at a storage station; and wherein the pairing comprises:

determining that the arrangement of the qualified bare cell does not meet the pairing requirement for the bare cells when one qualified bare cell and one defective bare cell exist in the pairing zone of any conveying apparatus;

moving, by the picking apparatus, the defective bare cell along the preset direction to the storage station; and moving, by the picking apparatus, the bare cell at a corresponding buffer position along the preset direction to a vacant carrying section corresponding to the defective bare cell when the corresponding buffer position on the buffer station contains a qualified bare cell.

10. The method according to claim 9, wherein the pairing further comprises:

moving, by the picking apparatus, a qualified bare cell in the corresponding pairing zone along the preset direction to a corresponding buffer position when the corresponding buffer position on the buffer station is vacant; and moving, by the corresponding conveying apparatus, two vacant carrying sections to a downstream side of the pairing zone, so that two carrying sections upstream of the corresponding pairing zone move into the corresponding pairing zone.

11. The method according to claim 9, wherein the pairing further comprises:

moving the buffer station in a straight line parallel to the conveying direction of the conveying apparatuses to align a bare cell at a corresponding buffer position on the buffer station with a carrying section corresponding to a defective bare cell in the pairing zone.

12. The method according to claim 9, wherein defective bare cells are stored at a storage station; and wherein the method further comprises:

moving, by the picking apparatus, the defective bare cells along the preset direction to the storage station when both bare cells in any pairing zone are defective; and moving, by the corresponding conveying apparatus, two vacant carrying sections to a downstream side of the pairing zone, so that two carrying sections upstream of the corresponding pairing zone move into the corresponding pairing zone.

13. The method according to claim 1, wherein each conveying apparatus moves a distance corresponding to two carrying sections each time, so that during each movement, each conveying apparatus moves two carrying sections to the downstream side of the pairing zone and moves two carrying sections upstream of the pairing zone into the pairing zone.

14. A system for pairing bare cells comprising:

at least two conveying apparatuses, wherein a direction in which the at least two conveying apparatuses are arranged side by side is a preset direction, the preset direction is arranged to intersect with a conveying direction of the conveying apparatuses, each conveying apparatus is formed with a loading zone, a pairing zone, and a plurality of carrying sections for carrying bare cells, the plurality of carrying sections are arranged in the corresponding conveying direction, a span of the loading zone in the conveying direction and a span of the pairing zone in the conveying direction both are greater than a span of two carrying sections in the conveying direction, and the conveying apparatuses are capable of driving the plurality of carrying sections to sequentially pass through the loading zone and the pairing zone;

a buffer station, located on a side of one conveying apparatus facing away from another conveying apparatus along the preset direction, wherein the buffer station is capable of moving in a straight line parallel to the conveying direction of the conveying apparatuses, and the buffer station is configured to store only qualified bare cells; and a picking apparatus, at least configured to pick up a qualified bare cell for reciprocal movement along the preset direction between the buffer station and the pairing zone, wherein the picking apparatus is capable of independently picking up two bare cells arranged in the conveying direction of the conveying apparatuses and moving the two bare cells together.

15. The system according to claim 14, wherein the system further comprises a storage station located on a side of the buffer station facing away from the conveying apparatuses along the preset direction, wherein the picking apparatus is configured to move reciprocally along the preset direction at least between the buffer station, the pairing zone, and the storage station, and the storage station is configured to store defective bare cells.

16. The system according to claim 14, wherein the system further comprises a loading mechanism, an image capture device, a loading table, and an adjustment apparatus, wherein each conveying apparatus has a loading zone and an inspection zone, two carrying sections in the loading zone and two carrying sections in the inspection zone are sequentially and adjacently arranged in the conveying direction of the conveying apparatus, the pairing zone is located downstream of the corresponding inspection zone, the image capture device is located above the conveying apparatus to capture images of the bare cells on the conveying apparatus, a projection area of the image capture device in a vertical direction is within a projection area of the inspection zone in the vertical direction, the loading table is located at an end of the conveying apparatus facing away from the conveying direction of the conveying apparatus, the adjustment apparatus is located at an end of the loading table facing away from the conveying direction of the conveying apparatus, the adjustment apparatus is configured to adjust a state of the bare cells, the loading mechanism is capable of independently picking up two bare cells arranged in the conveying direction of the conveying apparatus and moving the two bare cells together, and the loading mechanism is configured to load the bare cells on the loading table onto the carrying sections in the loading zone of the conveying apparatus.

* * * * *